United States Patent [19]
Davis

[11] Patent Number: 6,160,884
[45] Date of Patent: *Dec. 12, 2000

[54] TELEPHONE RING SIGNAL DETECTOR

[75] Inventor: William Folsom Davis, Tempe, Ariz.

[73] Assignee: Dasym Technologies Inc., Mesa, Ariz.

[ * ] Notice: This patent is subject to a terminal disclaimer.

[21] Appl. No.: 09/096,964

[22] Filed: Jun. 12, 1998

Related U.S. Application Data

[62] Division of application No. 08/876,446, Jun. 16, 1997, Pat. No. 5,920,024.

[51] Int. Cl.$^7$ ...................................................... H04N 1/00
[52] U.S. Cl. ............................................ 379/373; 379/377
[58] Field of Search ..................................... 379/373, 375, 379/361, 180–185, 377, 382, 93.11, 351

[56] References Cited

U.S. PATENT DOCUMENTS

| | | |
|---|---|---|
| 4,491,691 | 1/1985 | Embree et al. . |
| 4,723,275 | 2/1988 | Hirth et al. ............................... 379/375 |
| 4,939,775 | 7/1990 | Houch et al. . |
| 5,544,241 | 8/1996 | Dibner et al. . |
| 5,920,624 | 7/1999 | Davis ....................................... 379/373 |

OTHER PUBLICATIONS

American National Standards Institute, Inc., "Interface Between Carriers and Customer Instalations—Analog Voicegrade Switched Access Lines Using Loop—Start and Gound–Start Signalling". T1.401–1993, Aug. 18, 1993 pp. 24, 52 U.S.A.

Bellcore, "OTGR:Network Maintenance: Transport Surveillance–Additional Transport and Transport–Based Surveillance, Section S.2", TR–TSY–000821, Issue 1, Jun. 1990, pp. 43, 54, Fig. 5.2–9, Table 5.2–7 U.S.A.

Bellcore, "LSSGR: Call Processing, Section 5.", TR–NWT–000505, Issue 3, May 1991, pp. 5–8, 5–11, 5–12, U.S.A..

Bellcore, "LSSGR: Signaling For Analog Interfaces," GR–506–Core, Issue 1, Jun. 1996, pp. 3–4, 3–10, 3–1, 3–2, 2–1, 14–2, U.S.A.

*Primary Examiner*—Curtis A. Kuntz
*Assistant Examiner*—George Eng

[57] ABSTRACT

A telephone ring signal detector distinguishes a telephone ring signal voltage from a telephone pre-ring signal voltage on a telecommunication line at a premise, and is unresponsive to the pre-ring voltage and responsive only to the ring signal voltage for providing a telephone ring signal detect output signal during a first quarter cycle time period of a first telephone ring signal. A line switch couples an off-hook terminal impedance to the line in response to the ring detect signal for the purpose to exchanging telecommunication signals to and from the line. The detector provides a signal translating device for translating the ring and pre-ring signal voltages into a translated telephone signal having a translated peak ring signal voltage and a translated peak pre-ring signal voltage. During an adaptive voltage mode, an adaptive reference device responds to the translated telephone signal to provide an adaptive reference voltage which is adapted to be less than the translated peak ring signal voltage and greater than the translated peak pre-ring signal voltage when the off-hook impedance is uncoupled from the line. During a ring signal detect mode, a comparator provides the ring signal detect output signal when the translated telephone signal exceeds the adaptive reference voltage. The ring detect signal is independent of variations in a peak ring signal voltage, variations in a peak pre-ring signal voltage, variations in a pre-ring signal voltage transition time interval, variations in a telecommunication line resistance due to variations in a telecommunication line length, and independent of variations in a total ring signal impedance coupled to the line at the premise.

22 Claims, 9 Drawing Sheets

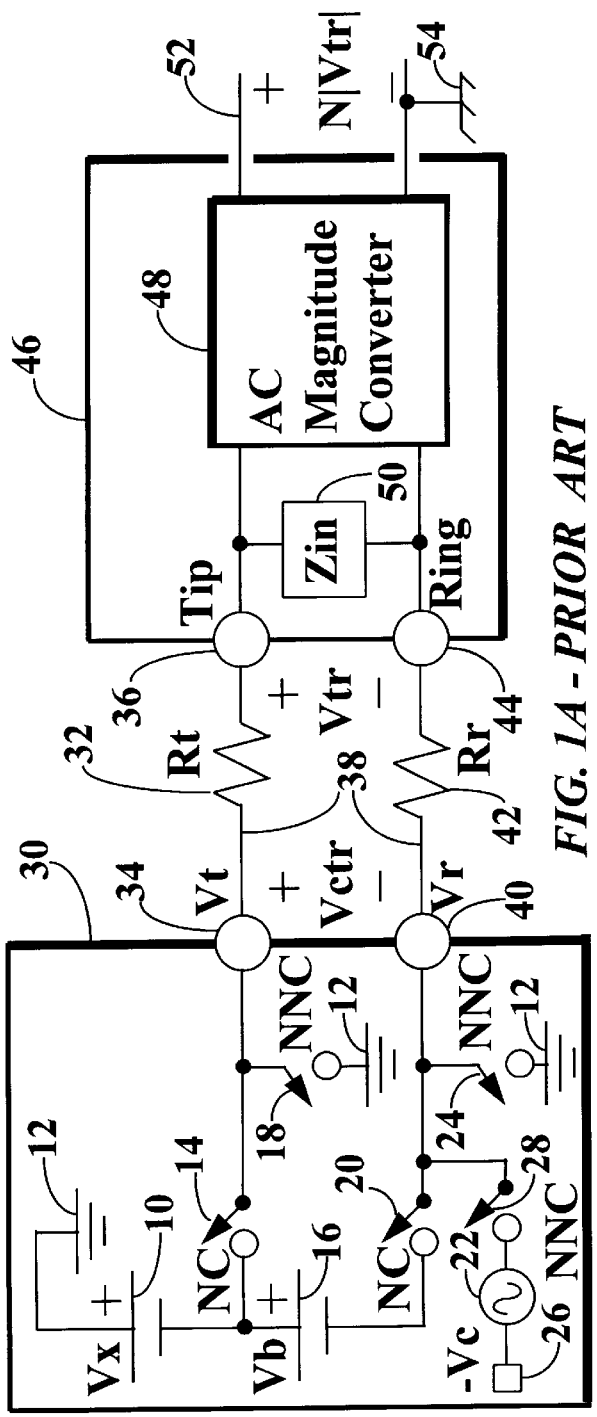
FIG. 1A - PRIOR ART
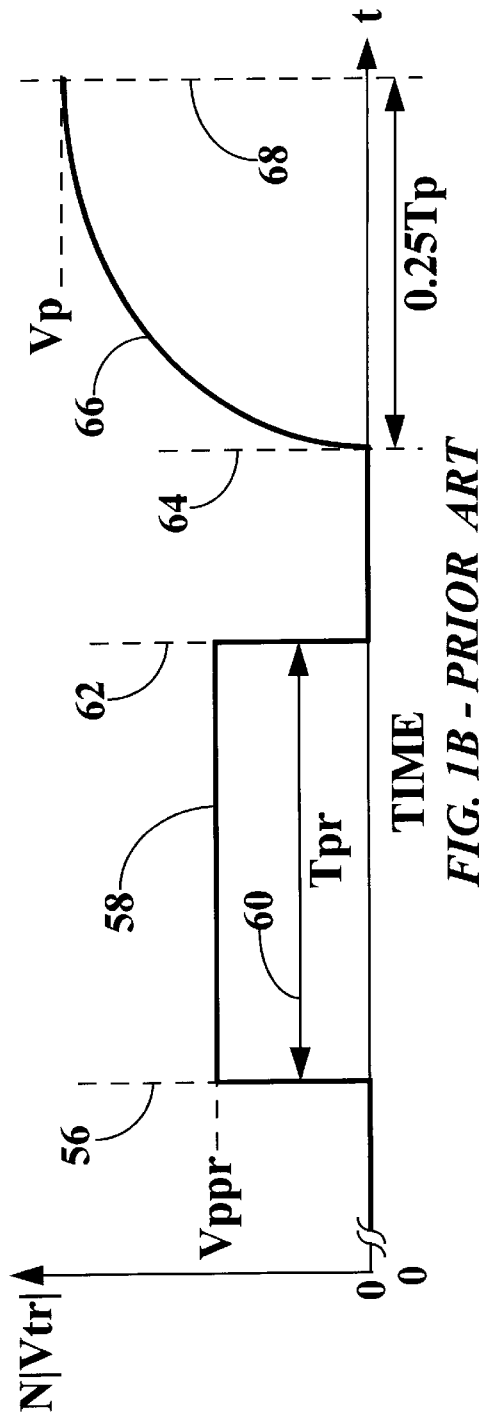
FIG. 1B - PRIOR ART

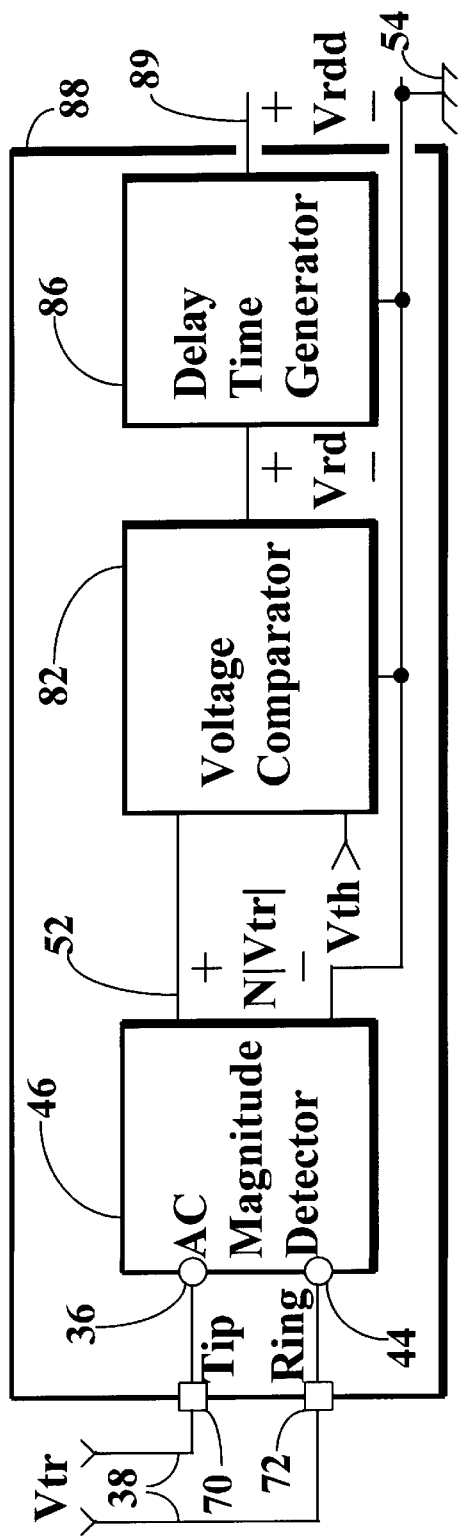
*FIG. 2A - PRIOR ART -*
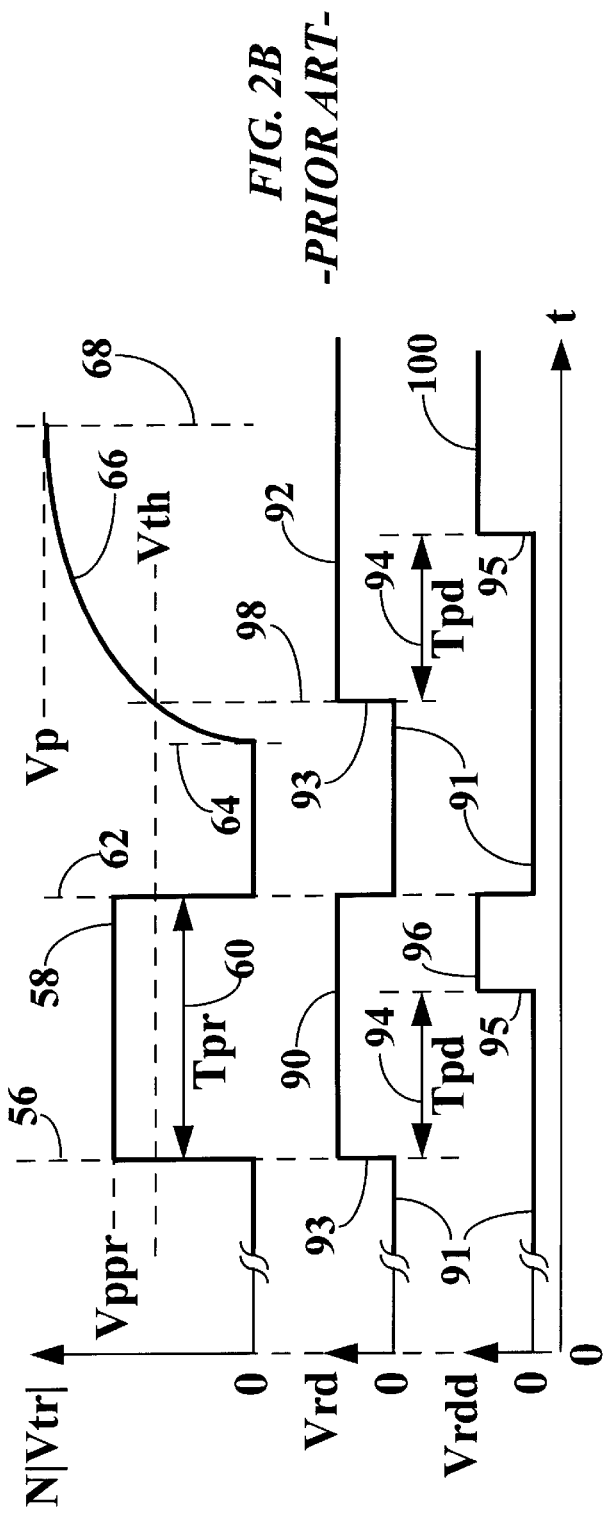
*FIG. 2B - PRIOR ART -*

TELEPHONE RING SIGNAL DETECTOR

CROSS REFERENCE TO RELATED APPLICATIONS

This application is a division of U.S. patent application Ser. No. 08/876,446 filed Jun. 16, 1997 now U.S. Pat. No. 5,920,624 and entitled TELEPHONE RING SIGNAL DETECTOR and assigned to the assignee of the present invention, the teachings of which are hereby incorporated by reference.

BACKGROUND OF THE INVENTION

This invention relates to telecommunications and, more specifically, to a telephone ring signal detector which detects a telephone ring signal on a telecommunication line during a first quarter cycle time period of a first telephone ring signal, by using a comparator to compare a magnitude of a telephone ring signal voltage with a threshold voltage which is adapted to a peak ring signal voltage.

In the telephone art, several different electrical voltages are transmitted by a Telephone Company Central Office (CO) on a telecommunication line. The line usually consists of two wires coupled from the CO to at least one premise telephone device at a subscriber premise. For example, the CO typically provides a nominal 48 volt direct current (DC) battery voltage between the wires for providing an electrical interface which allows the CO to appropriately communicate by electrical signals with a premise telephone. During an incoming telephone call to the premise, the CO also transmits a telephone alternating ring signal voltage between the wires for activating an audible alerting device typically associated with the premise telephones. The CO may further provide a telephone alternating pre-ring signal voltage between the wires prior to the ring signal. For example, ANSI document T1-401-1993 defines an Open Switch Interval (OSI) as a switching time prior to the ring signal when the battery voltage is disconnected from between the wires and when a ring signal generator is being switched to the wires. According to Bellcore documents TR-TSY-000821 and TR-NWT-000505, the CO may also activate a per-call subscriber line test prior to the ring signal. This line test is provided for detecting any excessive voltage on the line and for measuring line impedance between the wires and from each wire to ground. Bellcore document GR-506-CORE further indicates that during a Loop Current Feed Open (LCFO) Interval, when the battery voltage is disconnect for a duration not to exceed 0.3 seconds, each wire may be independently or simultaneously grounded, and a CO voltage may be independently or simultaneous applied to each wire with respect to ground. Multiple LCFOs can also occur, separated by at least a 0.1 second time interval when the battery voltage is momentarily connected to the line. When the CO generates OSIs and LCFOs for per-call line tests prior to the ring signal, the resulting pre-ring signal voltage on the line can exhibit a peak pre-ring signal voltage and an alternating pre-ring signal cycle that is similar to a peak ring signal voltage and an alternating ring signal cycle associated with the telephone ring signal. As a result, many known telephone ring signal detectors cannot distinguish between the pre-ring signal voltage and the ring signal voltage, causing these detectors to provide an invalid response to the pre-ring signal voltage.

Recently, enhanced telephone ring signal detectors have been developed to allow an automated telephone answering device (TAD) to silently answer incoming calls without activating any audible ringer mechanisms associated with premise telephones connected to the wires. These enhancements are described in the cross referenced patent application Ser. No. 08/876,446 by Davis, and in U.S. Pat. No. 5,544,241 to Dibner, on Aug. 6, 1996. According to Davis, a ring detect signal is provided when a first ring signal voltage exceeds a threshold voltage prior to a first quarter cycle time period of a first telephone ring signal cycle time period. According to one aspect of Dibner's ring signal detector, the ring detect signal is provided after the magnitude of the first ring signal voltage exceeds the threshold voltage for a predetermined time interval, which can be less then the first quarter cycle time period of the first telephone ring signal cycle time period. For both the Davis and Dibner ring signal detectors, a telephone device off-hook terminal impedance is coupled to the wires in response to the ring detect signal. As a result, the CO detects the off-hook impedance and terminates the first ring signal voltage before it can achieve sufficient magnitude or energy to activate any of the audible ringer mechanisms coupled to the wires. The off-hook impedance is a terminal impedance exhibited by the telephone when the telephone's receiver is removed from the telephone's cradle and hook switch.

Since the enhanced ring signal detectors described by Davis and Dibner both initiate an output response when the first ring signal voltage exceeds the threshold voltage, an invalid ring detect signal can result for both detectors when a first pre-ring signal voltage exceeds the threshold voltage. As a result, the off-hook impedance is coupled to the wires in response to the invalid ring detect signal prior to an activation of the ring signal voltage. Since the CO recognizes the off-hook impedance as a busy subscriber telephone line, the CO sends an audible busy signal to a caller without activating the ring signal voltage, and the off-hook impedance remains coupled to the wires at the premise in an erroneous off-hook state. Thus the enhanced ring signal detectors by Davis and Dibner may erroneously respond to the pre-ring signal voltage, producing an undesired telecommunications behavior just described.

Although a high frequency line noise voltage on the line can be filtered prior to being applied to the ring detector, many known telephone ring signal detectors utilize a delay time generator or a time averaging circuit to reject high frequency noise for discriminating between the line noise voltage and the ring signal voltage. Dibner's detector employs the delay time generator, and U.S. Pat. Nos. 4,939,775 to Houck et al, on Jul. 3, 1990 and 4,491,691 to Embree et al, on Jan. 1, 1985, employ the time averaging circuits to provide a valid ring detect signal after the magnitude of the ring signal voltage exceeds the threshold voltage for a predetermined time interval. However, these detectors can also provide the invalid ring detect signal, by detecting the pre-ring signal voltages when the pre-ring signal voltage exceeds the threshold voltage for a transition time interval greater than the predetermined time interval. In Dibner's example, any peak pre-ring signal voltage greater than 45 volts for a transition time interval between 0.005 and 0.05 seconds will produce the invalid ring detect signal. In Houck's example, any peak pre-ring signal voltage greater than 28 volts for a transition time interval between 0.05 and 0.1 seconds will produce the invalid ring detect signal.

Furthermore, variations in the peak pre-ring signal voltage and the peak ring signal voltage at the CO, variations in a line resistance between the CO and the premise due to variations in the line length, and variations in the number of ringer mechanisms coupled to the line at the premise all contribute to a difficulty for ring signal detectors to distinguish between the pre-ring signal voltage and the ring signal voltage and to provide the valid ring detect signal in the presence of the pre-ring signal voltage.

Hence there is a need for an improved telephone ring signal detector, which can distinguish between pre-ring signal voltages and ring signal voltages, being unresponsive to pre-ring signal voltages and be only responsive to ring signal voltages, and providing the ring detect signal during the first quarter cycle time period and being independent of variations in line voltage magnitudes, line length, and line loading conditions.

SUMMARY OF THE INVENTION

Accordingly, it is an object of the present invention to provide an improved telephone ring signal detector.

It is a further object of the present invention to provide an improved telephone ring signal detector, which distinguishes between a telephone alternating pre-ring signal voltage and a telephone alternating ring signal voltage, both voltages being on a telecommunication line and being caused by a Telephone Company Central Office (CO).

It is another object of the present invention to provide an improved telephone ring signal detector, which is unresponsive to a telephone alternating pre-ring signal voltage; yet being responsive to a telephone alternating ring signal voltage.

It is yet another object of the present invention to provide an improved telephone ring signal detector, which is unresponsive to a telephone alternating pre-ring signal voltage; yet provides a ring signal detect output signal in response to a telephone alternating ring signal voltage, during a first quarter cycle time period of a first telephone ring signal voltage.

It is a still further object of the present invention to provide an improved telephone ring signal detector, which is unresponsive to a telephone alternating pre-ring signal voltage; yet couples a telephone device off-hook terminal impedance to a telecommunication line in response to a ring signal detect output signal which occurs during a first quarter cycle time period of a first telephone ring signal voltage.

Yet another object of the present invention is to provide an improved telephone ring signal detector, which is unresponsive to a telephone alternating pre-ring signal voltage; yet provides a delayed ring signal detect output signal during a first quarter cycle time period of a first telephone ring signal voltage in response to a ring signal detect output signal.

Still another object of the present invention is to provide an improved telephone ring signal detector, which is unresponsive to a telephone alternating pre-ring signal voltage; yet couples a telephone device off-hook terminal impedance to a telecommunication line in response to a delayed ring signal detect output signal which occurs during a first quarter cycle time period of a first telephone ring signal voltage.

Other objects of the present invention include an improved telephone ring signal detector which is unresponsive to a telephone alternating pre-ring signal voltage; yet provides a ring signal detect output signal which occurs during a first quarter cycle time period of a first telephone ring signal voltage and which is independent of variations in a peak ring signal voltage, variations in a peak pre-ring signal voltage, variations in a pre-ring signal voltage transition time interval, variations in a telecommunication line resistance and inductance due to variations in a telecommunication line length, and independent of variations in a total ring signal impedance associated with premise telephones which are coupled to the telecommunication line.

According to one aspect of the present invention, there is provided an improved telephone ring signal detector for detecting a telephone ring signal having a peak ring signal on a telecommunication line and for distinguishing the telephone ring signal from a telephone pre-ring signal having a peak pre-ring signal on the telecommunication line comprising: a signal translating device for translating the telephone ring signal and the telephone pre-ring signal into a translated telephone signal having a translated peak ring signal and a translated peak pre-ring signal; an adaptive reference device for generating an adaptive reference in response to the translated telephone signal; and a comparator device for outputting a ring signal detect output signal when the translated telephone signal exceeds an adaptive threshold having a value greater than the translated peak pre-ring signal and less than the translated peak ring signal. The comparator device has a comparator device offset. The adaptive threshold is a sum of the adaptive reference plus the comparator device offset, whereby the ring signal detect output signal occurs during a first quarter cycle time period of a first telephone ring signal on the telecommunication line.

According to another aspect of the present invention, the telephone ring signal detector further comprises: a line impedance device for providing a telephone device off-hook terminal impedance; and a line switch device for coupling the line impedance device to the telecommunication line in response to the ring signal detect output signal. This enables the telephone device off-hook terminal impedance of the line impedance device to be coupled to the telecommunication line during a first quarter cycle time period in response to the ring signal detect output signal.

According to yet another aspect of the present invention, the adaptive reference device comprises: a signal peak detector device for holding the translated peak ring signal; a storage timing device for providing a storage control signal for a predetermined storage time interval after the first quarter cycle time period; a peak signal storage device for providing a stored representation of the translated peak ring signal in response to the storage control signal; and a signal converter device for converting the stored representation of the translated peak ring signal into the adaptive reference.

According to still another aspect of the present invention, the telephone ring signal detector further comprises: a mode control device for providing a first predetermined mode control signal and a second predetermined mode control signal; a line switch mode control input device for receiving the first and second predetermined mode control signals; and an adaptive reference mode control input device for receiving the first and second predetermined mode control signals. The first predetermined mode control signal enables the line switch device to be unresponsive to the translated telephone signal and enables the adaptive reference device to generate the adaptive reference, and the second predetermined mode control signal enables the line switch device to be responsive to the ring signal detect output signal and enables the adaptive reference device to provide a substantially constant value of the adaptive reference.

According to a further aspect of the present invention there is provided a telephone ring signal detector further comprising a ring signal detect delay time generator device for providing a delayed ring signal detect output signal in response to the ring signal detect output signal after a predetermined ring signal detect delay time. The delayed ring signal detect output signal occurs during a first quarter cycle time period of a first telephone ring signal on the telecommunication line.

According to a still further aspect of the present invention there is provided a telephone ring signal detector whereby the line switch device couples the line impedance device to the telecommunication line in response to the delayed ring signal detect output signal. This enables the telephone device off-hook terminal impedance of the line impedance device to be coupled to the telecommunication line during the first quarter cycle time period in response to the delayed ring signal detect output signal.

The above and other objects, features and advantages of the present invention will be more clearly understood from the following detailed description taken in conjunction with the accompanying drawings, in which

BRIEF DESCRIPTION OF THE DRAWINGS

FIG. 1A shows a partial block and circuit diagram of a Telephone Company Central Office 30 (CO) coupled to an AC magnitude detector 46 by a telecommunications line 38, and FIG. 1B shows a voltage vs. time waveform of a translated telephone signal voltage N|Vtr|, including a first translated telephone pre-ring signal voltage 58 and a first translated telephone ring signal voltage 66;

FIG. 2A is a block diagram of a prior art telephone ring signal detector 88, and FIG. 2B shows voltage vs. time waveforms associated with FIG. 2A;

DETAILED DESCRIPTION OF THE DRAWINGS

Figure 3:
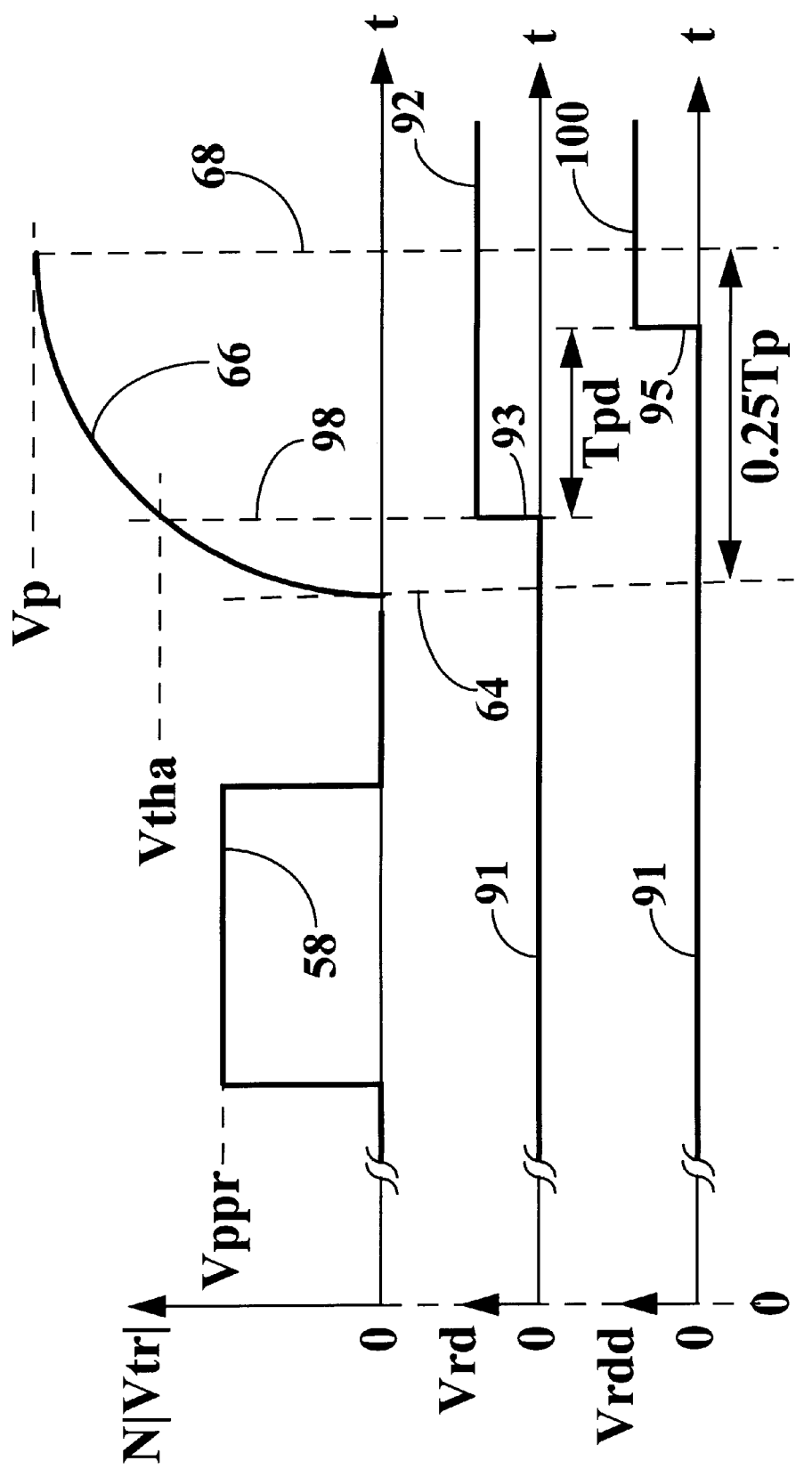
FIG. 3 demonstrates basic voltage vs. time waveforms associated with the present invention when the present invention is in a ring signal detect mode.

FIG. 1A shows a partial block and circuit diagram including a simplified circuit example of a Telephone Company Central Office 30 (CO) coupled by a telecommunication line 38 to an AC magnitude detector 46 typically associated with an electronic telephone device located at a telephone subscriber premise. The AC designation is an indication of an alternating current or an alternating voltage. FIG. 1A is utilized to describe a CO behavior, a CO to detector 46 interface, and a detector 46 behavior including a voltage vs. time waveform of FIG. 1B. The CO 30 provides a Direct Current (DC) offset battery 10, having a battery offset voltage (Vx), and is coupled to a CO reference ground 12 and a CO output Tip terminal 34 through a first normally conductive (NC) battery switch 14. A DC line battery 16, having a line voltage (Vb), is coupled to battery 10 and to a CO output Ring terminal 40 through a second NC battery switch 20. A telephone ring signal generator 22 is coupled to a ring signal DC offset voltage (−Vc) by a ring signal offset terminal 26 and to terminal 40 through a ring signal connect switch 28 which is normally non-conductive (NNC). A NNC Tip-to-ground switch 18 and a NNC Ring-to-ground switch 24 can couple terminals 34 and 40 respectively to ground 12 when switches 18 and 24 are closed, and all other switches are open. In a line idle state when switches 14 and 20 are closed and all other switches are open, terminal 34 exhibits a Tip voltage (Vt) of voltage −Vx, and terminal 40 exhibits a Ring voltage (Vr) of voltage −(Vx+Vb). Since a CO Tip-to-Ring output voltage (Vctr) is a voltage difference (Vt−Vr) between terminals 34 and 40, then a DC value of voltage Vctr is voltage Vb. Voltage Vctr is coupled between a magnitude detector input Tip terminal 36 and a magnitude detector input Ring terminal 44 by line 38 to provide a Tip-to-Ring input voltage (Vtr) at an input of detector 46. Line 38 consists of a Tip wire having a Tip line resistance 32 (Rt) between terminals 34 and 36 and a Ring wire having a Ring line resistance 42 (Rr) between terminals 40 and 44. A ring signal input impedance 50 (Zin) represents an input impedance of detector 46 between terminals 36 and 44 at a predetermined ring signal frequency. Voltage Vtr is not equal to voltage Vctr due to a line attenuation factor K=Vtr/Vctr caused by a total line resistance (Rt+Rr) and a total ring signal impedance at the premise, including impedance 50 and any additional ring signal input impedances across terminal 36 and 44. When an AC telephone signal is coupled by CO 30 to line 38, an AC magnitude converter 48 translates the AC signal at the input of detector 46 into a translated telephone signal. Thus when voltage Vtr is an AC telephone signal voltage, converter 48 translates voltage Vtr into a scaled Tip-to-Ring voltage magnitude (N|Vtr|) (or a voltage N|Vtr|) which is provided at a magnitude detector output coupled to line 52 relative to a detector reference ground 54. Voltage N|Vtr| can also be defined as a translated telephone signal voltage, since the AC signal voltage is translated by converting voltage Vtr to voltage magnitude |Vtr| and voltage magnitude |Vtr| is scaled by a voltage scale factor N. Generator 22 provides a CO telephone ring signal characterized by an alternating ring signal voltage having a ring signal cycle time period Tp, a CO peak ring signal voltage (Vpco) and being offset from ground 12 by voltage −Vc. In an alerting state when generator 22 is activated, all switches are opened except switch 28 and switch 18 which are closed. Switch 28 couples generator 22 with the ring signal offset voltage to terminal 40 and switch 18 provides for a ring signal ground return path through line 38 and detector 46 to ground 12. Switch 18, when used in conjunction with switch 24, can also provide for a pre-ring line test on line 38 prior to the ring signal, to monitor for an excessive line voltage being applied to the wires by a voltage source external to CO 30 and to monitor for a low AC line impedance between the wires and from each wire to ground 12.

FIG. 1B in cooperation with FIG. 1A will be used to discuss the response of detector 46 to AC signals that result from the CO ring signal and from the pre-ring line test In FIG. 1B, a voltage N|Vtr| vs. time waveform is shown during the pre-ring line test and during a portion of the ring signal period. In this example, the pre-ring line test is initiated at a pre-ring signal start time 56 when switches 14, 20 and 28 are opened, and switches 18 and 24 are closed. Thus during a pre-ring signal time interval 60 (Tpr), terminals 34 and 40 are simultaneously shorted to ground 12 through switches 18 and 24. When the excessive voltage exists on either the Tip wire or the Ring wire, an excessive line current flows through the appropriate switch being coupled to the excessive voltage. Thus CO 30 can determine the presence of the excessive voltage and which wire exhibits the excessive voltage by monitoring the excessive current. In addition, voltage Vctr dynamically changes from voltage Vb to zero volts, producing a change in voltage Vctr by voltage Vb at time 56. It should be understood that zero volts in this text means substantially zero volts, but not necessarily precisely 0 volts. When a pre-ring signal stop time 62 occurs, switches 18, 24 and 28 are opened and switches 14 and 20 are closed, causing voltage Vctr to change from zero volts back to voltage Vb. As a result, a CO AC pre-ring voltage is generated on line 38 with a peak voltage magnitude of voltage Vb due to the change in voltage Vctr caused by switches 18 and 24 during the line test. The CO pre-ring voltage can be used by CO 30 to measure a corresponding AC current change across terminals 34 and 40, providing CO 30 with an impedance calculation of a CO output terminal impedance between terminals 34 and 40. During time interval Tpr, the CO pre-ring voltage is a voltage component of voltage Vctr and is attenuated by factor K to produce a telephone pre-ring voltage as a voltage component of voltage Vtr=K(Vctr) at the input of detector 46. Since a CO peak pre-ring voltage is voltage Vb, then voltage Vtr will exhibit a peak pre-ring voltage K(Vb) due to factor K. Thus a CO pre-ring signal resulting from the CO pre-ring voltage is attenuated by factor K to produce a telephone pre-ring signal having a peak pre-ring signal of voltage K(Vb) at the input of detector 46. Since converter 48 responds to a change in voltage Vtr to produce voltage N|Vtr|, then detector 46 outputs a translated pre-ring signal voltage as a first translated pre-ring signal voltage 58 having a translated peak pre-ring signal voltage (Vppr)=N|K(Vb)|. Voltage 58 can also be generated by other methods of pre-ring line testing. For example when all switches are open, voltage −Vb can be applied to terminals 34 and 40 simultaneously for time interval Tpr to provide an independent leakage current measurement to determine a leakage resistance from each CO terminals 34 and 40 to ground 12. Since voltage Vctr equals zero volts during time interval Tpr for this case, the resulting AC voltage change in voltage Vctr is also voltage Vb. As a result, the peak pre-ring voltage is also equal to voltage K(Vb) across terminals 36 and 44, producing voltage 58 as previously described. After time 62 when pre-ring line tests are completed, generator 22 is coupled to line 38 during a ring signal switching time by opening switches 14 20 and 24, and closing switches 18 and 28. Additional pre-ring voltages due to a dynamic change in voltage Vctr may also occur during the ring signal switching time. Although additional pre-ring voltages can result from other line test methods and switching conditions at CO 30, voltage 58 represents at least one cycle resulting from a typical pre-ring signal voltage prior to a ring signal start time 64. At time 64, CO 30 activates generator 22 to provide a first telephone ring signal as a CO ring signal voltage having voltage Vpco. The CO ring signal voltage is attenuated by factor K to generate a telephone ring signal voltage having a peak ring signal voltage K(Vpco) at the input of detector 46. Voltage K(Vpco) results from voltage Vpco being attenuated by factor K. Thus a telephone ring signal having a peak ring signal occurs on line 38 at the input of detector 46 due to the telephone ring signal voltage having the peak ring signal voltage at the input of detector 46. Since converter 48 responds to voltage changes in voltage Vtr to produce voltage N|Vtr|, detector 46 outputs a translated telephone ring signal voltage which is a first translated telephone ring signal voltage 66, increasing in a substantially sinusoidal manner during a first quarter cycle time period (0.25 Tp) of the first telephone ring signal. Voltage 66 increases from zero volts at time 64 to a translated peak ring signal voltage (Vp)=N(K|Vpco|) at a first quarter cycle time 68. It should be clear that voltage 58 having voltage Vppr and the voltage 66 having voltage Vp are both voltage components of voltage N|Vtr|.

FIG. 2A shows a block diagram example of a typical known telephone ring signal detector 88 located at the premise for detecting the ring signal voltage which is coupled to line 38 by CO 30. Detector 88 comprises detector 46, a voltage comparator 82, and a ring signal detect delay time generator 86. Line 38 is coupled to a Tip input port 70 and to a Ring input port 72 for detector 88 to receive voltage Vtr. Terminals 36 and 44 of detector 46 are coupled to ports 70 and 72 respectively for detector 46 to receive voltage Vtr. Detector 46 functions as described in FIG. 1A and FIG. 1B. Comparator 82 provides a first voltage comparator input coupled to the output of detector 46 by line 52 to receive voltage N|Vtr|. Comparator 82 provides a second voltage comparator input coupled to receive a predetermined threshold voltage (Vth). Comparator 82 further provides a ring signal detect binary output voltage (Vrd) at a voltage comparator output which is coupled to generator 86 at a ring signal detect delay time generator input. Generator 86 provides a delayed ring signal detect binary output voltage (Vrdd) at a ring signal detect delay time generator output which is coupled to a delayed ring signal detect output line 89. Operationally, detector 46 translates the AC voltage of voltage Vtr on line 38 into voltage N|Vtr| on line 52. When voltage N|Vtr| exceeds voltage Vth, comparator 82 causes a binary state change in voltage Vrd, indicating a ring signal detection which activates generator 86 to generate a predetermined time delay. After the time delay, a binary state change occurs in voltage Vrdd indicating a delayed ring signal detection. The time delay provides a high frequency filtering function to insure ring signal detection does not occur until a line voltage on line 38 exceeds a line threshold voltage for at least the time delay before the ring signal detection occurs. Thus high line voltages which are not ring signals and that occur for a time less than the time delay are not detected, preventing ring signal detection. Voltages N|Vtr|, Vrd, and Vrdd are referenced to ground 54.

FIG. 2B demonstrates waveforms of voltages N|Vtr|, Vrd, and Vrdd vs. time from time 56 to time 68. At time 56, voltage 58 increases from zero volts to voltage Vppr and remains at voltage Vppr for time interval Tpr. When voltage 58 becomes greater than voltage Vth, comparator 82 causes voltage Vrd to increase from a binary low voltage state 91 to a binary high voltage state 90, and remains in state 90 for time interval Tpr. A binary low voltage to a binary high voltage state change in voltages Vrd indicates a ring signal detect output signal 93. The binary low voltage and binary high voltage states can also be generally referred to as a state Vlo and a state Vhi respectively for any binary voltage. However, state 90 is also an invalid ring signal detect state for voltage Vrd, since it occurs prior to initiation of voltage 66. Generator 86 is also activated at time 56 to generate a predetermined ring signal detect delay time 94 (Tpd) in response to signal 93. After time Tpd, generator 86 causes voltage Vrdd to increase from state 91 to a high state 96. A state Vlo to a state Vhi change in voltage Vrdd indicates a delayed ring signal detect output signal 95. However, state 96 is also an invalid delayed ring signal detect state for voltage Vrdd, since it also occurs prior to the initiation of voltage 66. When voltage 58 becomes less than voltage Vth at time 62, comparator 82 causes voltages Vrd and Vrdd to also decrease to state 91, terminating the invalid states 90 and 96. After time 64, voltage 66 increases to voltage Vp at time 68. When voltage 66 exceeds voltage Vth at a ring signal threshold crossing time 98, comparator 82 causes voltage Vrd to increase to a ring signal detect high state 92 and to remain in state 92 until at least time 68. State 92 is a valid ring signal detect state for voltage Vrd. At time 98, signal 93 activates generator 86 to produce time Tpd. After time Tpd, voltage Vrdd increases from low state 91 to a delayed ring signal detect high state 100 and remains in state 100 until at least time 68. State 100 is a valid delayed ring signal detect state for voltage Vrdd.

Since time interval Tpr can have a duration of 0.3 seconds and since time Tpd is typically less than 0.3 seconds, then known detectors providing a typical ring signal detect function of detector 88 can produce the invalid states 90 and 96 after voltage 58 exceeds voltage Vth for at least time Tpd prior to time 64. When additional devices associated with detector 88 couples a telephone device off-hook terminal impedance to line 38 prior to time 64 in response to the invalid state 90 or 96, an erroneous off-hook state can result on line 38 prior to time 64, causing an undesirable telecommunication behavior.

According to one aspect of the present invention in a preferred embodiment, when voltage Vth is increased to an adaptive threshold voltage (Vtha) which is greater than voltage Vppr but less than voltage Vp, the invalid states 90 and 96 associated with voltage 58 shown in FIG. 2B are eliminated, and only the valid states 92 and 100 associated with voltage 66 occur during time period 0.25 Tp of the first telephone ring signal as shown in FIG. 3. However, due to variations in resistances Rt and Rr of line 38 and in CO voltages Vpco and Vb, and in the total ring signal impedance on line 38 at the premise, significant variations in voltages Vppr and Vp can result, causing a fixed value of voltage Vtha to be impractical for multiple premise applications. From FIG. 1, variations in resistance Rt and Rr, impedance Zin, and any additional ring signal impedances coupled between terminals 36 and 44 can cause significant variations in the AC voltages of voltage Vtr relative to voltage Vctr. A worst case attenuation factor (Kwc) due to a worst case line condition can be defined using Bellcore document GR-506-CORE which specifies a worst case line resistance sum (Rt+Rr) of 1930 ohms, including a premise line resistance, for a maximum line length, and further specifies a minimum 20 Hz ring signal impedance of 1400 ohms between terminals 36 and 44 at the premise. As a result, factor Kwc=Vtr/Vctr=0.476 at a 20 Hz ring signal frequency according to this Bellcore Document. A best case attenuation factor (Kbc) equals 1 when resistance (Rt+Rr) for line 38 is essentially zero [(Rt+Rr)=0] for a very short line length. Factor Kbc can also approach 1 when the total ring signal impedance at the premise is much greater than resistance (Rt+Rr). Document GR-506-CORE also specifies a maximum CO DC value of voltage Vb of 56.7 volts and a minimum CO ring signal voltage of 84 Vrms, resulting in a minimum peak ring signal voltage of 118.8 peak volts for voltage Vpco. Utilizing this Bellcore data, a maximum value of voltage Vppr and a minimum value of voltage Vp can be determined at the premise. For example, assuming voltage Vb=56.7 volts and factor N=1 and factor Kbc=1, then the maximum value of voltage Vppr=N|Kbc(Vb)|=(1)(1)(56.7), or 56.7 peak volts for voltage 58. Assuming voltage Vpco=118.8 peak volts and factor N=1 and factor Kwc=0.476, then the minimum value of voltage Vp=N|Kwc(Vpco)|=(1)(0.476)(118.8), or 56.55 peak volts for voltage 66. Since it is possible for voltage Vppr to equal 56.7 volts at a first particular premise, and voltage Vp to equal 56.55 volts at a second particular premise, then for these cases, it is impossible to define the fixed value of voltage Vtha to be greater than voltage Vppr and less than voltage Vp for all possible premise locations due to variations in CO voltages and line conditions described above.

However by adapting voltage Vtha to be a function of voltage Vp and a CO voltage scaling ratio Vb/Vpco, voltage Vtha can be provided and adapted to be greater then voltage Vppr and less than voltage Vp for all possible CO voltages and line conditions at any particular premise location. For example, assume the minimum CO value of ring signal voltage is 84 Vrms (Vpco=188.8 peak volts) and the maximum value of voltage Vb is 56.7 volts. For this case assuming Kwc=0.476 and N=1, the minimum value of voltage Vp is Vp=(1)(0.476)(188.8)=56.55 peak volts and the maximum value of voltage Vppr is (1)(0.476)(56.7 volts)=27 peak volts. Thus when voltage Vtha is greater than 27 volts and less than 56.55 volts, only the valid states 92 and 100 shown in FIG. 2B and FIG. 3 will occur. For another example, assume the same CO voltages with factor Kbc=1 and factor N=1. For this case, the minimum value of voltage Vp is (1)(1)(118.8)=118.8 peak volts and the maximum value of voltage Vppr is Vb=(1)(1)(56.7)=56.7 peak volts. Thus when voltage Vtha is greater than 56.7 volts and less than 118.8 volts, only the valid states 92 and 100 shown in FIG. 2B and FIG. 3 will occur. In general, when voltage Vtha is greater than voltage (Vp)(Vppr/Vp), and less than voltage Vp, voltage Vtha will be greater than voltage Vppr and less than voltage Vp. Since voltages Vppr=N|K(Vb)| and Vp=N|K(Vpco)| are both attenuated and scaled by the same factors K and N, then ratio Vppr/Vp is independent of factors K and N and is strictly defined by the CO voltage ratio Vb/Vpco which is typically predetermined in a telecommunication standards document such as the Bellcore documents. Thus by measuring voltage Vp at a particular premise location and having identified ratio Vb/Vpco as being predetermined in a telecommunication standards document, voltage Vtha can be defined and adapted to be greater than voltage Vp(Vb/Vpco) and less than voltage Vp for a subsequent pre-ring and ring signal voltage sequence at the premise location. Voltage Vp can be measured at time 68, since time 68 is a first time voltage Vp occurs. Thus the present invention can distinguish the ring signal voltage from the pre-ring signal voltage, and is unresponsive to the pre-ring signal voltage in that invalid states 90 and 96 do not occur prior to time 64. The present invention is only responsive to the ring signal voltage to provide the valid ring detect states 92 and 100 during time period 0.25 Tp of the first telephone ring signal for all premise locations.

Figure 4:
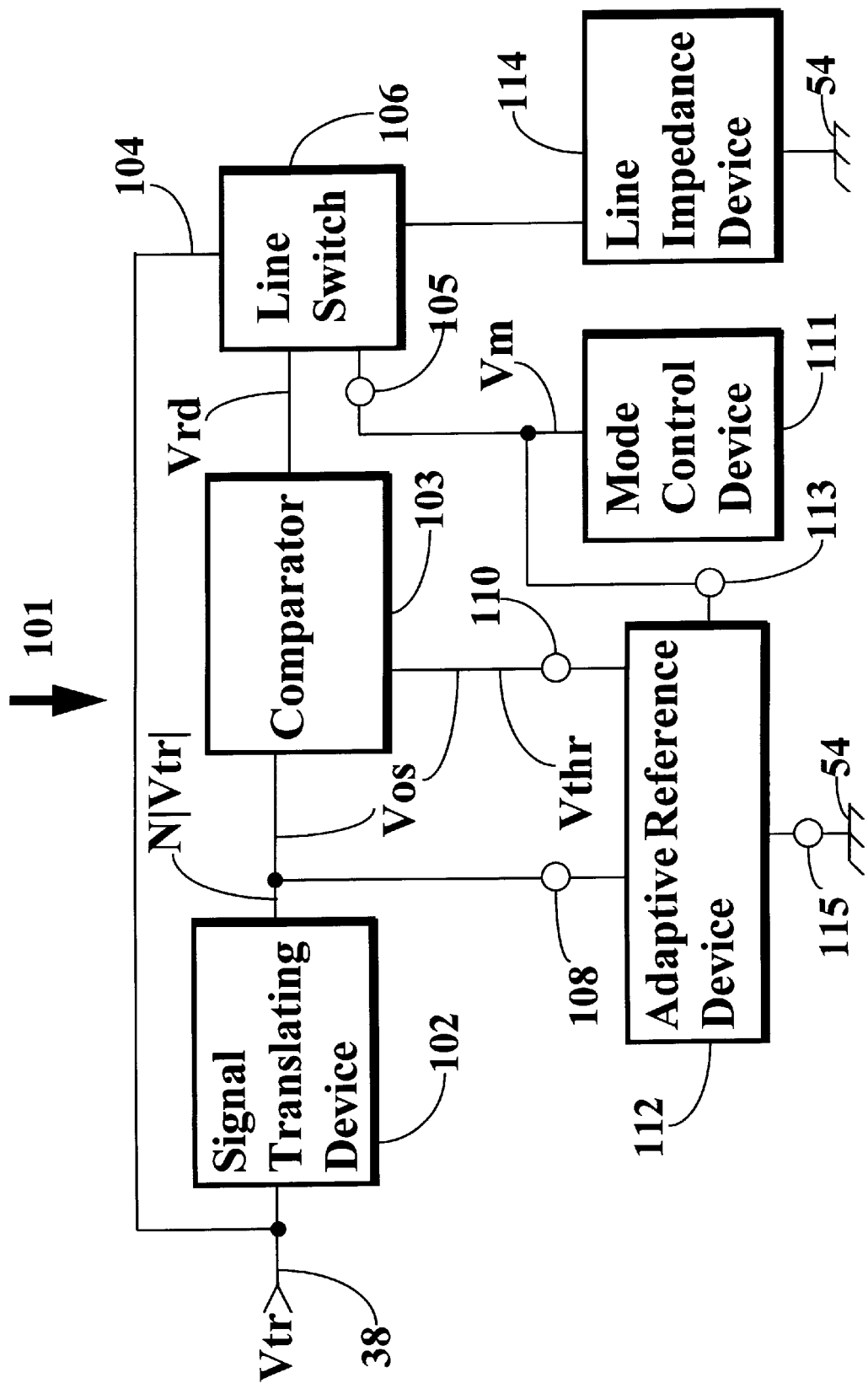
FIG. 4 illustrates a basic block diagram of a telephone ring signal detector in accordance with one aspect of the present invention.

FIG. 4 shows a block diagram of the preferred embodiment of a telephone ring signal detector 101 which provides several aspects of the present invention for detecting the ring signal voltage on line 38. The ring signal and pre-ring signal on line 38 are coupled to detector 101, and detector 101 distinguishes the ring signal voltage having the peak ring signal voltage from the pre-ring signal voltage having the peak pre-ring signal voltage on line 38. These signal voltages are voltage components of voltage Vtr on line 38. Detector 101 comprises a signal translating device 102, a comparator 103, an adaptive reference device 112, a line switch 106, a line impedance device 114, and a mode control device 111. Device 102 has a signal translating device input coupled to line 38 for receiving the ring signal voltage and the pre-ring signal voltage. Device 102 also has a signal translating device output for outputting voltage N|Vtr| having voltages Vp and Vppr as voltage components. Device 112 has an adaptive reference device input terminal 108 coupled to the translating device output for receiving voltage N|Vtr| and for generating an adaptive reference voltage (Vthr) in response to voltage N|Vtr|. Device 112 also has an adaptive reference device output terminal 110 for outputting voltage Vthr relative to an adaptive voltage reference terminal 115 which is coupled to ground 54 in the preferred embodiment. A first comparator input of comparator 103 is coupled to the translating device output for receiving voltage N|Vtr|, and a second comparator input of comparator 103 is coupled to terminal 110 for receiving voltage Vthr. A comparator output of comparator 103 outputs voltage Vrd and the ring detect signal when voltage N|Vtr| exceeds voltage Vtha. Comparator 103 also has a comparator offset voltage (Vos) defined as an offset voltage between the first and second comparator inputs when the ring detect signal occurs. Voltage Vos can be of any predetermined polarity and of any predetermined voltage magnitude including precisely zero volts. As a result, voltage Vtha is equal to a sum of voltage Vthr plus voltage Vos, or Vtha=(Vthr+Vos) relative to ground 54. Device 114 provides a line impedance device output for providing the off-hook terminal impedance. Switch 106 has a line switch input coupled to the output of comparator 103 for receiving the ring detect signal, and has a first coupling input coupled to line 38 through an input coupling line 104 and has a second coupling input coupled to the impedance device output. Device 111 has a mode control device output for providing a mode control binary voltage (Vm) having a first predetermined mode control signal, such as state Vhi, to activate an adaptive reference voltage generation mode, or adaptive mode, and a second predetermined mode control signal, such as state Vlo, to activate a ring signal detect mode, or ring detect mode. Since voltage Vm is binary, activating the first mode control signal deactivates the second mode control signal, and activating the second mode control signal deactivates the first mode control signal. A line switch mode control input terminal 105 is coupled to switch 106 and to the control device output for receiving the first and second mode control signals. An adaptive reference mode control input terminal 113 is coupled to device 112 and to the control device output for also receiving the first and second control signals. All voltages shown in FIG. 4, except voltage Vtr and voltage Vos, are relative to ground 54.

Functionally, device 102 translates the ring signal and pre-ring signal voltages on line 38 into the translated voltage N|Vtr|, having voltages Vp and Vppr as voltage components. As an example, device 102 can be detector 46, providing a full wave rectifier function for translating the ring signal voltage and the pre-ring signal voltage into a scaled voltage magnitude comprising a scaled ring signal voltage having a scaled peak ring signal voltage and a scaled pre-ring voltage having a scaled peak pre-ring voltage respectively, all voltages being voltage components of the scaled voltage magnitude. When detector 101 is in the adaptive mode, voltage Vm is in state Vhi. When state Vhi is applied to terminal 113, device 112 receives voltage N|Vtr| and generates voltage Vthr in response to voltage N|Vtr|. Device 112 generates voltage Vthr by measuring voltage Vp associated with voltage N|Vtr|, and utilizes the predetermined values of ratio Vb/Vpco and of voltage Vos to determine and adapt voltage Vtha to voltages Vp and Vos. As a result, voltage Vtha is adapted to have a value greater than voltage Vppr and less than voltage Vp as discussed using FIG. 3, and Vtha=(Vthr+Vos). State Vhi at terminal 105 also enables switch 106 to be unresponsive to voltage N|Vtr| by providing an open circuit between the first and second coupling inputs of switch 106, which maintains an open circuit between the output of device 114 and line 38 during the adaptive mode. When detector 101 is in the ring detect mode, voltage Vm is in state Vlo. When state Vlo is applied to terminal 113, device 112 provides a substantially constant value of voltage Vthr which is predetermined during a preceding ring signal. The substantially constant value of voltage Vthr implies that voltage Vthr is intended to be non-varying, but in reality may slightly vary by a predetermined percentage due to a manufacturing variation, a supply voltage variation, or other design related variances. In addition, when state Vlo is applied to terminal 105, switch 106 will be responsive to the ring detect signal. Comparator 103 compares voltage N|Vtr| with voltage Vtha, and when voltage N|Vtr| exceeds voltage Vtha, comparator 103 outputs the ring detect signal during time period 0.25 Tp of the first telephone ring signal. Switch 106 is responsive to the ring detect signal by coupling the output of device 114 to line 38 through the first and second coupling inputs of switch 106. As a result of the off-hook terminal impedance being coupled to line 38 during time period 0.25 Tp in response to the ring detect signal, CO 30 detects the off-hook terminal impedance and terminates a first telephone ring signal voltage before it can achieve sufficient magnitude or energy to activate any audible ringer mechanisms associated with telephone devices connectable to line 38. Although the off-hook terminal impedance could be coupled to line 38 after time 68, the present invention is most effective when device 114 is coupled to line 38 during time period 0.25 Tp. After device 114 is coupled to line 38, a telecommunication signal can be received from line 38 and transmitted to line 38 in a well known manner by telecommunication circuitry which is coupled to device 114 and may include telecommunication circuitry associated with device 114.

Figure 5:
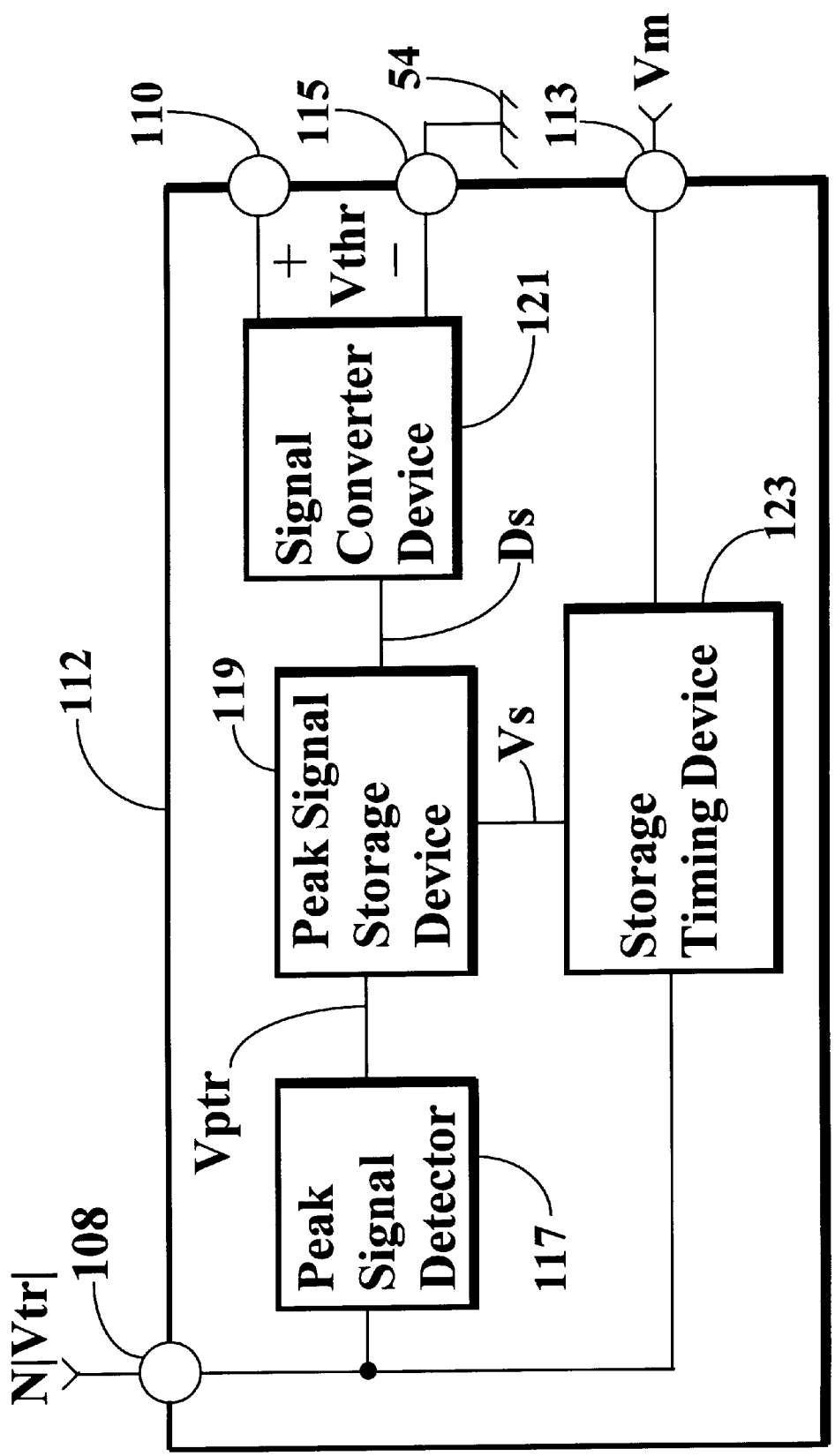
FIG. 5 shows a block diagram of the adaptive reference device 112.

FIG. 5 shows a block diagram of the preferred embodiment of device 112 which provides further aspects of the present invention for generating voltage Vthr. Device 112 comprises a peak signal detector 117, a peak signal storage device 119, a storage timing device 123, and a signal converter device 121. Detector 117 has a peak signal detector input coupled to the input of device 112 for receiving voltage N|Vtr| through terminal 108 and has a peak signal detector output for outputting and holding voltage Vp as a voltage component of a translated telephone peak signal voltage (Vptr). Device 123 has a storage timing device input coupled to the input of device 112 for receiving voltage N|Vtr| through terminal 108 and has a storage timing device output for outputting a storage control binary voltage (Vs) and for outputting a storage control signal in response to voltage N|Vtr|. The storage control signal occurs for a predetermined storage time interval (Ts) after time period 0.25 Tp when voltage Vp of voltage N|Vtr| has occurred and thus voltage Vp can be determined. Device 123 also has a timing device mode control input coupled to terminal 113 to receive voltage Vm and the first and second mode control signals. Storage device 119 has a peak signal storage device input coupled to the output of detector 117 for receiving voltage Vp and has a peak signal storage device output for outputting a stored representation (Ds) of voltage Vp. Device 119 also has a peak signal storage enable input coupled to the output of device 123 for receiving the storage control signal and for enabling device 119 to store voltage Vp as representation Ds in response to the storage control signal. Device 121 has a signal converter device input coupled to the output of device 119 for receiving representation Ds and has a signal converter device output coupled to terminal 110 for outputting voltage Vthr relative to terminal 115. Terminal 115 in the preferred embodiment is coupled to ground 54.

During the ring signal voltage and after detector 101 is in the adaptive mode, voltage Vp becomes the voltage component of voltage N|Vtr|. Detector 117 receives voltage N|Vtr| and holds voltage Vp at the output of detector 117. Device 123 receives voltage Vm in state Vhi which enables device 123 to receive voltage N|Vtr| to determine when time period 0.25 Tp of the first telephone ring signal voltage has occurred. After device 123 has determined that time period 0.25 Tp has occurred, device 123 outputs the storage control signal for time interval Ts at the output of device 123. Device 119 receives voltage Vp during time interval Ts and stores voltage Vp as representation Ds after time interval Ts. Representation Ds is unresponsive to any changes in voltage Vp after time interval Ts unless detector 101 remains in the adaptive mode and a subsequent telephone ring signal voltage occurs. Device 121 converts representation Ds into voltage Vthr at terminal 110 relative to terminal 115. In the preferred embodiment, device 121 converts representation Ds into a converter reference voltage (Vcr), where voltage Vcr equals voltage Vp. Device 121 then scales voltage Vcr (or voltage Vp) into voltage Vthr based on the predetermined values of ratio Vb/Vpco and voltage Vos. For example, since voltage Vtha=(Vthr+Vos) must be adapted to be less than Vp and to be greater than Vp(Vb/Vpco), then [(Vthr+Vos)<Vp] and [(Vthr+Vos)>Vp(Vb/Vpco)] which leads to Vthr<(Vp−Vos) and Vthr>[Vp(Vb/Vpco)−Vos] as an upper and a lower range limit of voltage Vthr. Device 121 provides voltage Vthr between these voltage range limits, insuring that voltage Vtha is less than voltage Vp and greater than voltage Vp(Vb/Vpco) as required. After the representation of voltage Vp is stored, device 123 is reset and detector 117 is reset to receive a subsequent voltage N|Vtr|. When detector 101 remains in the adaptive mode, the subsequent ring signal voltage causes a subsequent value of voltage Vp (voltage Vps) which is stored by device 119 as a subsequent stored representation (Dss). Representation Dss is converted into a subsequent value of voltage Vthr. This cycle continues until state Vlo for voltage Vm causes detector 101 to be in the ring detect mode. During the ring detect mode, state Vlo at terminal 113 prevents device 123 from responding to subsequent ring signal voltages, preventing any subsequent storage control signals and thus preventing subsequent values of voltage Vthr from being generated. As a result, the value of voltage Vthr when in the ring detect mode is adapted to the last preceding representation Ds in response to the last preceding voltage Vp when detector 101 was in the adaptive mode. Thus voltage Vthr is substantially constant based on a constant stored value of representation Ds, causing voltage Vtha to be substantially constant. Thus the value of voltage Vtha which is adapted to voltage Vp as described insures that ring signal detection will occur only during time period 0.25 Tp for any premise location as discussed using FIG. 3. An adaptive voltage function of device 112 can be more clearly understood using a more detailed block diagram shown in FIG. 6 and associated voltage vs. time waveforms shown in FIG. 7 to describe the preferred embodiment of device 112.

Figure 6:
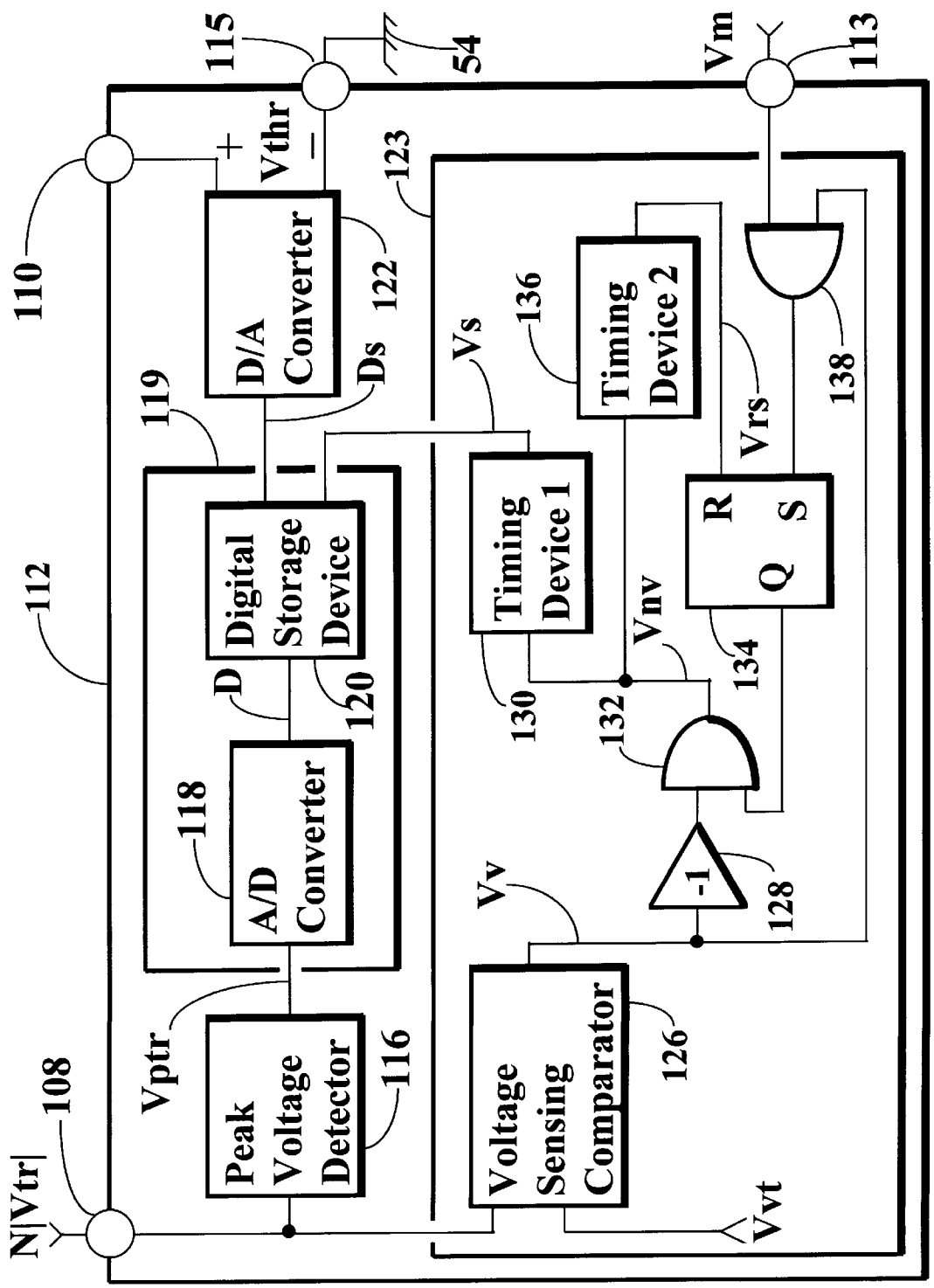
FIG. 6 demonstrates a preferred embodiment of device 112, including additional details of storage device 119 and a digital storage timing device 123.

FIG. 6 is a detailed block diagram of device 112 in the preferred embodiment comprising a peak voltage detector 116, which is a specific type of peak detector 117, a digital-to-analog (D/A) converter 122, which is a specific type of device 121, storage device 119, and timing device 123. Device 119 further comprises an analog-to-digital (A/D) converter 118, and a digital storage device 120 in the preferred embodiment. The A/D converter 118 has an A/D converter input coupled to the input of device 119 and to the output of detector 116 for receiving voltage Vp as the voltage component of voltage Vptr. Converter 118 also has an A/D converter output for outputting a translated peak ring signal voltage digital representation (D) which is a digital representation of voltage Vp. Device 120 has a digital storage device input coupled to the A/D converter output for receiving representation D and has a digital storage device output coupled to the output of device 119 for outputting representation Ds which, for this case, is a stored digital representation of representation D. Since representation D is the representation of voltage Vp, then representation Ds is the stored representation of voltage Vp. Device 120 has a digital storage enable input which is coupled to the storage enable input of device 119 and is coupled to the timing device output for enabling device 120 to receive and to store representation D of voltage Vp in response to the storage control signal. The D/A converter 122 has a D/A converter input coupled to output of device 119 for receiving representation Ds and has a D/A converter output coupled to terminal 110 for outputting voltage Vthr relative to terminal 115.

Functionally when detector 101 is in the adaptive mode, voltage N|Vtr| is received by detector 116 and voltage Vptr holds voltage Vp after time period 0.25 Tp when one voltage Vp occurs. In practice, many occurrences of voltage Vp can result during many cycles of the ring signal. The A/D converter 118 converts voltage Vp to representation D and provides representation D at the A/D converter output. Device 123 also receives voltage N|Vtr| to determine when time period 0.25 Tp occurs by determining when voltage N|Vtr| becomes terminated due to the ring signal voltage being terminated by CO 30. After the ring signal voltage is terminated, the storage control signal occurs for time interval Ts after a ring signal termination time (Trt). During time interval Ts, device 120 receives representation D for storing representation D. After time interval Ts, representation D becomes the stored representation Ds which is provided at the output of device 119. Representation Ds is a stored value of representation D which occurs during time interval Ts. Representation Ds is unresponsive to any changes in representation D after time interval Ts, unless detector 101 remains in the adaptive mode and a subsequent telephone ring signal voltage occurs as previously discussed. Converter 122 generates voltage Vthr by first converting representation Ds into voltage Vcr. In the preferred embodiment, voltage Vcr is equal to voltage Vp. Voltage Vthr is then determined by scaling voltage Vcr=Vp based on the predetermined values of ratio Vb/Vpco and voltage Vos as previously discussed using FIG. 5. However, in the preferred embodiment, voltage Vos is typically much less than voltage Vcr=Vp and voltage Vcr(Vb/Vpco)=Vp(Vb/Vpco). Thus voltage Vos is ignored in the following discussion. Voltage Vthr can be written as Vthr=Kr(Vcr), or Vthr=Kr(Vp) in the preferred embodiment, where Kr is a predetermined reference voltage scale factor. Factor Kr is predetermined to be less than 1 and greater than voltage ratio Vb/Vpco. For example, voltage Vthr must be greater than voltage Vp(Vb/Vpco) and less than voltage Vp to insure ring signal detection only during time period 0.25 Tp. For a more specific example, assume maximum voltage Vb is 56.7 volts and minimum voltage Vpco is 118.8 peak volts. Since ratio Vb/Vpco=0.48 for this case, then factor Kr can be between 1 and 0.48. By choosing an approximate midrange value of factor Kr between 1 and 0.48 such as Kr=0.75, then voltage Vthr becomes Vthr=0.75 Vp for this example. If the worst case factor Kwc is 0.476 and if N=1 is assumed, then voltage Vp=0.476(Vpco)=56.55 peak volts, and voltage Vppr=0.476 (Vb)=26.98 volts at the premise. Since voltage Vthr=0.75 (Vp)=(0.75)(56.55)=42.41 volts, then voltage Vthr is less than voltage Vp and greater than voltage Vppr. Thus when detector 101 is in the ring signal detect mode and after adapting voltage Vthr to voltage Vp in the adaptive mode, detector 101 distinguishes the ring signal voltage from the pre-ring signal voltage as a result of voltage Vtha being greater than voltage Vp(Vb/Vpco) and less than voltage Vp, insuring ring signal detection only during time period 0.25 Tp of the first telephone ring signal.

Device 123 comprises a voltage sensing comparator 126, a first timing device 130, a second timing device 136, an inverter 128, a first AND gate 132, a second AND gate 138, and an RS flip-flop 134. Comparator 126 has a first sensing comparator input coupled to the timing device input to receive voltage N|Vtr|, and has a second sensing comparator input coupled to receive a voltage sensing threshold voltage (Vvt). An output of comparator 126 provides a voltage sense binary output voltage (Vv) and is coupled to an input of inverter 128 and to a first input of gate 138. Comparator 126 can include a high frequency filter timing function to filter high frequency components of voltage N|Vtr|. An output of inverter 128 is coupled to a first input of gate 132. An output of gate 132 provides an inverted voltage sense binary output voltage (Vnv) and is coupled to an input of device 130 and to an input of device 136. An output of device 130 provides voltage Vs and the storage control signal and is coupled to the enable input of device 119. An output of device 136 is coupled to a Reset input (R) of flip-flop 134 and provides a timing reset binary voltage (Vrs). A second input of gate 138 is coupled to the timing mode control input and to terminal 113 to receive voltage Vm. An output of gate 138 is coupled to a Set (S) input of flip-flop 134. A Q output of flip-flop 134 is coupled to a second input of gate 132.

Figure 7:
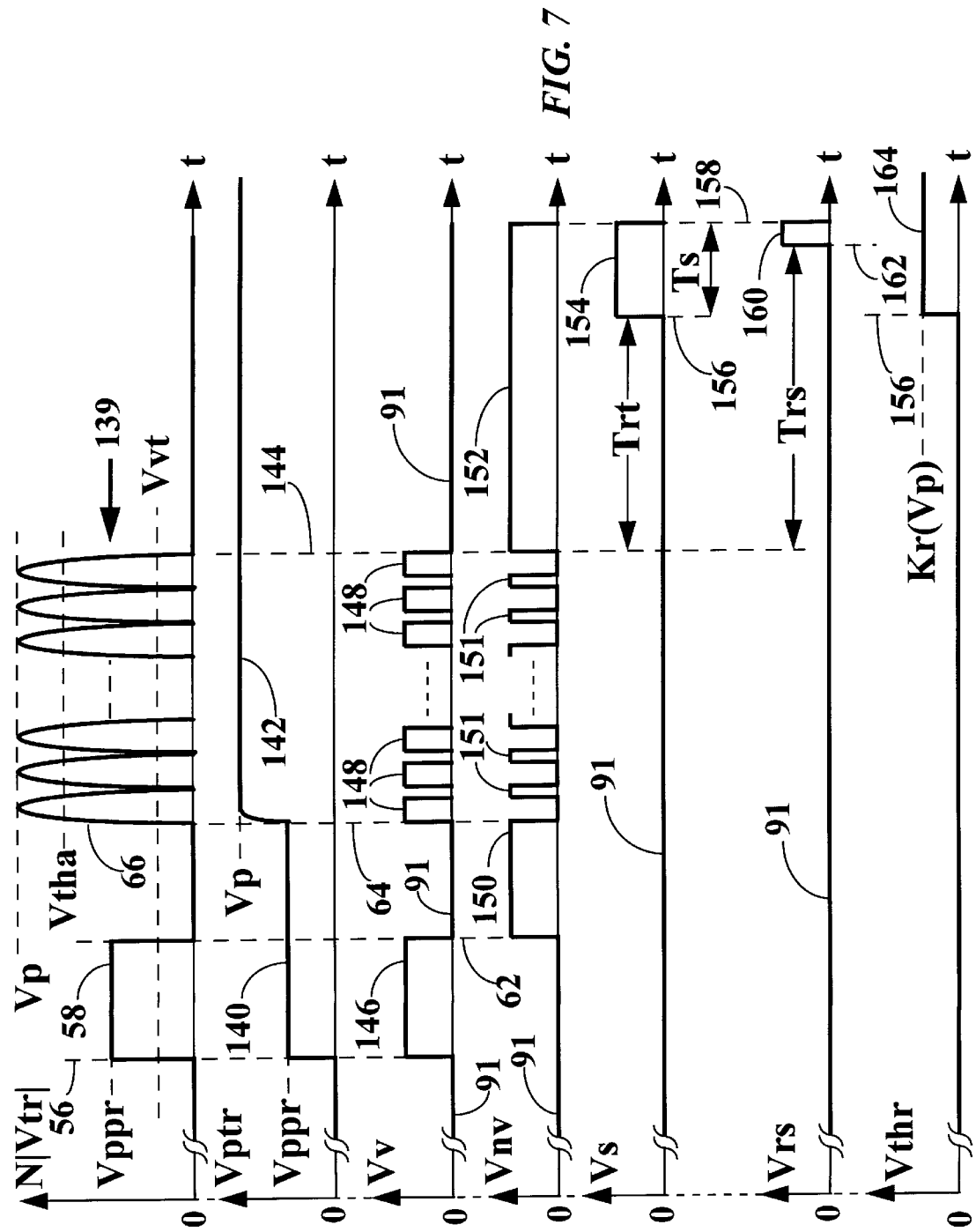
FIG. 7 illustrates voltage vs. time waveforms associated with the present invention when being in an adaptive reference voltage generation mode.

The detailed operation of device 123 to generate voltage Vthr in the adaptive mode will be further discussed employing FIG. 6 and FIG. 7. In the adaptive mode, when voltage Vm is in state Vhi, switch 106 of FIG. 4 is unresponsive to voltage N|Vtr| and voltage vs. time waveforms for voltages N|Vtr|, Vptr, Vv, Vnv, Vs, Vrs and Vthr are relevant. Upon initiating the adaptive mode, a predetermined reset signal resets flip-flop 134 to state Vlo at the Q output and resets detector 116 to reset voltage Vptr to zero volts. Prior to receiving any alternating voltages from CO 30 on line 38, voltage N|Vtr| is zero volts, causing detector 116 to maintain zero volts for voltage Vptr. In addition, comparator 126 provides state 91, or state Vlo for voltage Vv, since voltage N|Vtr| being zero volts is less than voltage Vvt. State Vlo at the first input of gate 138 maintains state Vlo at the Set input of flip-flop 134, and the Q output remains reset in state Vlo. State Vlo at the Q output causes gate 132 to initially provide state Vlo for voltage Vnv at the inputs of devices 130 and 136 to reset these devices to an initial time state and to prevent any timing function by these devices. Thus voltage Vs at the output of device 130 is initially in state Vlo and voltage Vrs at the output of device 136 is also initially in state Vlo after flip-flop 134 is reset. The initial value of voltage Vthr prior to time 56 is unimportant. When CO 30 begins a pre-ring and ring signal voltage sequence, voltage 58 increases from zero volts to voltage Vppr at time 56, and detector 116 causes voltage Vptr to become a first peak pre-ring voltage 140 with a value of voltage Vppr. When voltage N|Vtr| exceeds voltage Vvt at time 56, comparator 126 causes voltage Vv to become a high state 146. State 146 causes inverter 128 to provide state Vlo at the first input of gate 132 and causes gate 138 to couple state Vhi to the Set input of flip-flop 134 which responds by providing state Vhi at the Q output and at the second input of gate 132. During state 146, inverter 128 provides state Vlo at the first input of gate 132 causing gate 132 to maintain state Vlo for voltage Vnv at the inputs of devices 130 and 136. Thus devices 130 and 136 remain reset. At time 62, when voltage 58 decreases from voltage Vppr to zero volts, voltage Vptr remains held at voltage Vppr as shown by voltage 140. When voltage N|Vtr| becomes less than voltage Vvt at time 62, comparator 126 causes voltage Vv to decrease to state Vlo, causing inverter 128 to provide state Vhi at the first input of gate 132. State Vlo at the second input of gate 138 causes gate 138 to provide state Vlo at the Set input of flip-flop 134, maintaining state Vhi at the Q output. Since state Vhi occurs at the first and second inputs of gate 132 after time 62, gate 132 outputs a high state 150 for voltage Vnv after time 62. Both devices 130 and 136 respond to state 150 of voltage Vnv at their inputs by beginning their respective timing functions at time 62. Normally when state Vhi occurs at the inputs of devices 130 and 136, device 130 provides state Vhi for voltage Vs after time Trt and device 136 provides state Vhi for voltage Vrs after a timing reset time (Trs), where time Trs is greater than time Trt. However after time 64 when voltage 66 exceeds voltage Vvt, comparator 126 causes voltage Vv to a high state 148. As a result, inverter 128 provides state Vlo at the first input of gate 132, causing gate 132 to provide state Vlo for voltage Vnv which resets devices 130 and 136 before these devices can produce any output voltage. This results since times Trt and Trs are much greater than a time difference between time 62 and when voltage 66 exceeds voltage Vvt. Thus voltages Vs and Vrs remain in state Vlo during state 150. After time 64, many telephone ring signal voltage cycles occur, resulting in a telephone ring signal burst. The ring signal burst results in a full wave rectified ring signal voltage burst 139 for voltage N|Vtr|. During burst 139, voltage N|Vtr| alternately becomes greater and less than voltage Vvt. As a result, comparator 126 outputs voltage Vv as an alternating voltage between state 148 and state 91 during burst 139. In addition, inverter 128 in combination with gate 132 provides voltage Vnv as an inverted alternating voltage between state 151 and state 91 during burst 139. Since an alternating cycle time period for voltages Vv and Vnv is Tp/2, or half of time period Tp, the duration of state 151 is much less than times Trt and Trs. Thus devices 130 and 136 are prevented from completing their respective timing functions during state 151, causing voltages Vs and Vrs to remain in state Vlo during burst 139. In addition after time 64, voltage Vptr increases from voltage 140 (Vppr) to a second peak voltage 142 having a value of voltage Vp after time period 0.25 Tp and remains at this value until a digital storage time 158. At a ring signal burst termination time 144, burst 139 is terminated and thus voltage N|Vtr| is terminated due to the ring signal voltage being terminated by CO 30. Since voltage N|Vtr| is less than voltage Vv after time 144, comparator 126 causes voltage Vv to become state Vlo, causing gate 138 to provide state Vlo at the Set input of flip-flop 134, maintaining state Vhi at the Q output and at the second input of gate 132. Since inverter 128 provides state Vhi at the first input of gate 132 after time 144, state Vhi at both inputs of gate 132 causes voltage Vnv to become a high state 152 at time 144. State Vhi at the inputs of devices 130 and 136 causes their respective timing function to again begin at time 144. After time Trt, device 130 causes voltage Vs to increase to a high state 154 at a digital data receive time 156. After time Trs, device 136 causes voltage Vrs to increase to a high reset state 160 at a reset time 162. The high state 160 is applied to the Reset input of flip-flop 134, producing state Vlo at the Q output. The resulting state Vlo at the second input of gate 132 will cause gate 132 to provide state Vlo for voltage Vnv, resetting devices 130 and 136 which output state Vlo for both voltages Vs and Vrs at time 158. The duration of state 160 results from a device delay time associated with flip-flop 134, gate 132, and device 136. Time interval Ts results from the time difference between time 158 and time 156. During time interval Ts, representation D is received for storage by device 120. During time interval Ts, representation D is outputted by device 120 and converted by converter 122 to produce an adaptive voltage state 164 for voltage Vthr=Kr(Vp). After time 158, device 120 stores representation D which then becomes representation Ds which is provided at the output of device 119. Converter 122 continues to output voltage Vthr after time 158. The predetermined reset signal is again initiated after time 158, prior to a subsequent ring signal burst. The reset signal is applied to reset both flip-flop 134 and detector 116 as previously described.

When the subsequent ring signal burst occurs after time 158, a new adaptive reference voltage generation cycle begins. Voltage Vptr will increase from a zero volt reset value to the subsequent value of voltage Vp. When the subsequent voltage N|Vtr| exceeds voltage Vvt after time 158, comparator 126 provides state Vhi for voltage Vv which is again applied to the first input of gate 138 and to the input of inverter 128. As a result, flip-flop 134 is set, providing state Vhi at the Q output and at the second input of gate 132. Since inverter 128 provides state Vlo at the first input of gate 132, gate 132 provides the resulting state Vlo for voltage Vnv, maintaining the reset state of devices 130 and 136 as previously explained. When the subsequent ring signal burst is terminated, comparator 126 causes voltage Vv to become state Vlo. In response, inverter 128 and gate 132 in combination provides state Vhi for voltage Vnv, beginning the timing functions of devices 130 and 136 to generate a subsequent storage time interval Tss. In addition, A/D converter 118 provides a subsequent digital representation of voltage Vp (Dds) at the A/D converter output. During time interval Tss, representation Dds is received for storage by device 120. After time interval Tss, subsequent representation Dds is stored and provide at the output of device 119 as representation Dss. Representation Dss is converted by D/A converter 122 to a subsequent value of voltage Vthr which is a function of the subsequent value of voltage Vp as previously explained. Voltage Vthr continues to be subsequently generated in a similar manner until either the subsequent ring signal bursts are terminated by CO 30, or voltage Vm provides state Vlo at the second input of gate 138 to provide a termination of the adaptive mode and a beginning of the ring detect mode.

In the ring detect mode and after time 158, voltage Vm is in state Vlo, causing switch 106 of FIG. 4 to be responsive to the ring detect signal and to provide state Vlo at the second input of gate 138. Although voltage N|Vtr| at the input of device 123 causes comparator 126 to provide state Vhi for voltage Vv at the first input of gate 138, the reset state of state Vlo at the Q output of flip-flop 134 remains unaltered, since the Set input of flip-flop 134 maintains state Vlo due to state Vlo being at the second input of gate 138 in the ring detect mode. Thus state Vlo at the second input of gate 132 remains unaltered which causes gate 132 to maintain state Vlo at the inputs of devices 130 and 136. Thus devices 130 and 136 remain reset, preventing any timing functions by these devices and preventing any subsequent storage control signal such as state 154 from occurring for the duration of the ring detect mode. As a result, device 120 continues to store representation Ds of the last preceding voltage Vp generated during a preceding adaptive mode. Thus voltage Vthr is unresponsive to voltage N|Vtr| and is substantially constant at a value greater than voltage Vppr and less than voltage Vp.

Figure 8:
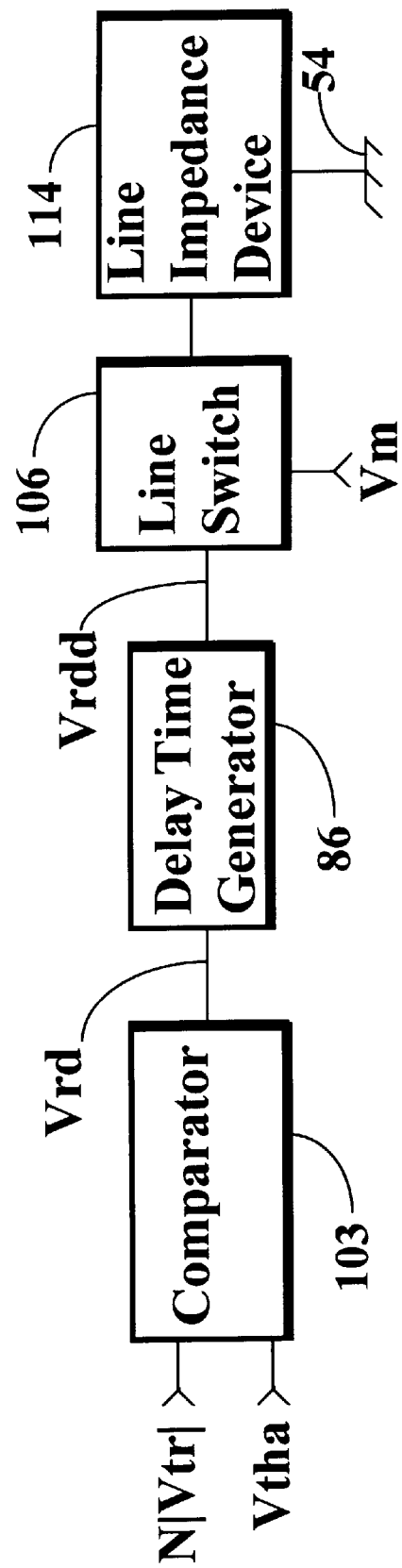
FIG. 8 demonstrates a partial block diagram of the present invention, including a time delay generator as another aspect of the present invention.

As yet another aspect of the present invention, a ring signal detect time delay option is provided, by employing generator 86 which is coupled between comparator 103 and switch 106 as shown in FIG. 8. The input of generator 86 is coupled to the output of comparator 103 to receive signal 93 associated with voltage Vrd. The input of switch 106 is coupled to the output of generator 86 for receiving voltage Vrdd and signal 95 in response to signal 93 after time Tpd. Operationally, FIG. 3 demonstrates that after time 98 when voltage Vrd becomes state 92 and signal 93 occurs, generator 86 begins a delay time function to generate time Tpd in response to signal 93. After time Tpd has occurred, the output of generator 86 outputs voltage Vrdd to high state 100 and provides signal 95. Switch 106 receives signal 95 and respond to signal 95 as previously described for signal 93 to couple the off-hook impedance of device 114 to line 38 in response to signal 95. In the preferred embodiment, coupling the impedance of device 114 to line 38 occurs during time period 0.25 Tp.

Figure 9:
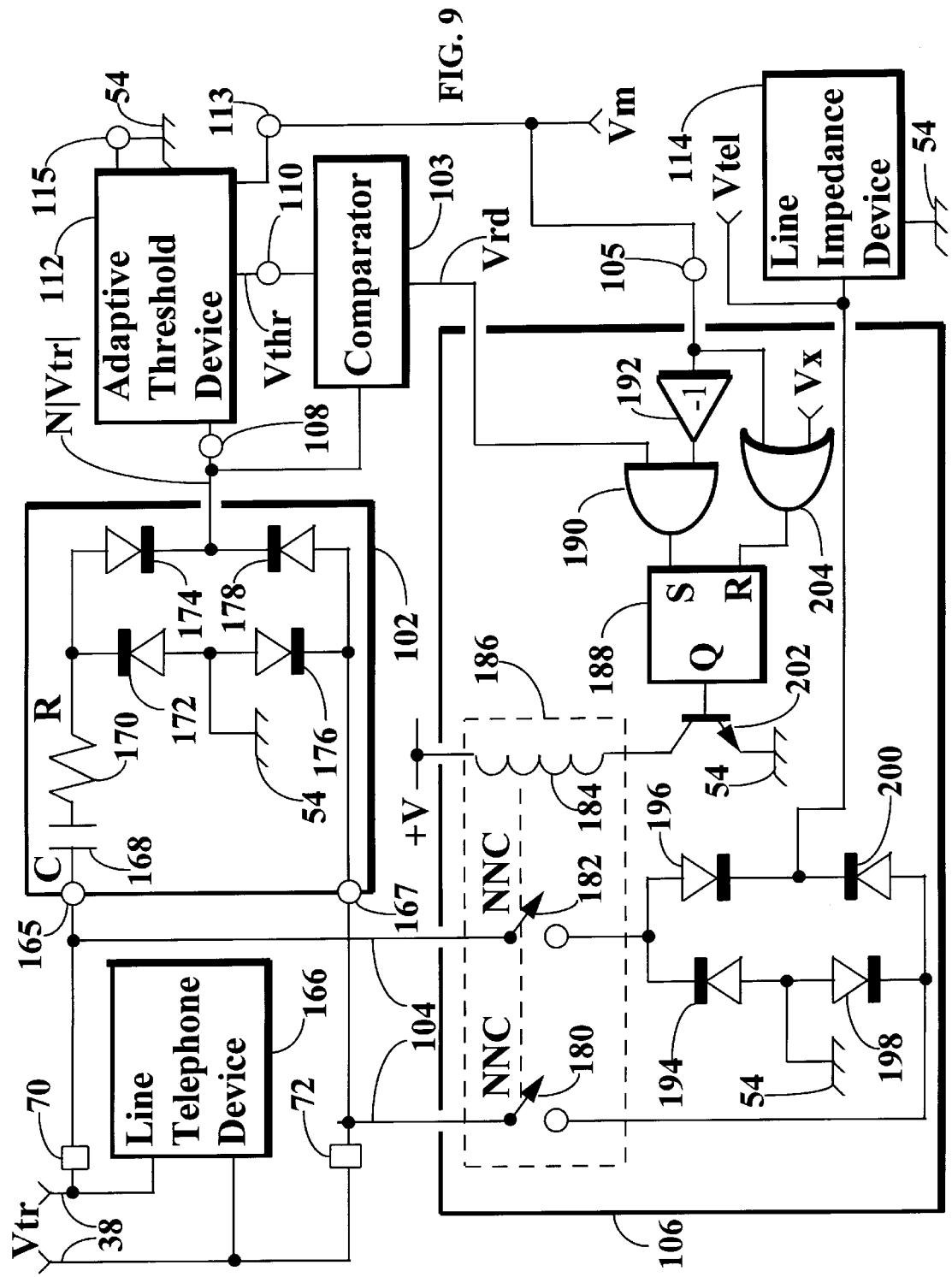
FIG. 9 shows a partial block and circuit diagram of the telephone ring signal detector, providing additional circuit detail for a line switch 106 and a translating device 102 in conjunction with a line telephone device 166 and a telecommunication line 38.

FIG. 9 is a partial block and circuit diagram of switch 106 and device 102 in conjunction with comparator 103, device 114, device 112 and a line telephone device 166 which is connectable to line 38. The circuit block connections of FIG. 9 are identical to those connections of FIG. 4. However connection circuit detail is provided for devices 102 and 106 to further clarify several aspects of the present invention. Device 102 is a well known circuit to AC couple the AC voltage of voltage Vtr on line 38 to the output of device 102. Device 102 comprises a capacitor 168 (C), a resistor 170 (R), and an AC detect diode bridge circuit employing bridge diodes 172, 174, 176, and 178. Device 102 provides a scaled full wave rectified output voltage which is a voltage component of voltage N|Vtr| relative to ground 54. Capacitor C is coupled to a first translating device input terminal 165 and to resistor R. Resistor R is coupled to an anode of diode 174 and a cathode of diode 172. An anode of diode 172 is coupled to an anode of diode 176 and to ground 54. A cathode of diode 174 is coupled to a cathode of diode 178 and to terminal 108 of device 112 and to the first input of comparator 103. A second translating device input terminal 167 is coupled to a cathode of diode 176 and an anode of diode 178. The diode bridge circuit of device 102 allows terminals 165 and 167 to be coupled to the Tip and Ring wires of line 38 at ports 70 and 72 respectively without consideration of voltage polarity. Scale factor N results from an input impedance of device 112 and comparator 103, and from voltage drops associated with an impedance of capacitor C, a resistance of resistor R, a resistance of the diode bridge circuit, and from a forward biased voltage drop associated with each forward biased diode of the diode bridge circuit. Switch 106 comprises a relay 186, an inverter 192, an AND gate 190, a RS flip-flop 188, a relay transistor 202, an OR gate 204, and an off-hook diode bridge circuit comprising bridge diodes 194, 196, 198 and 200. Relay 186 comprises a NNC switch 180 and 182 and a relay inductor 184. Switch 180 is coupled to terminal 167 and port 72 through line 104 and is further coupled to a cathode of diode 198 and an anode of diode 200. Switch 182 is coupled to terminal 165 and port 70 through line 104 and is coupled to a cathode of diode 194 and an anode of diode 196. An anode of diode 194 is coupled to an anode of diode 198 which is coupled to ground 54. A cathode of diode 196 is coupled to a cathode of diode 200 and to the output of device 114. Device 114 is also coupled to receive and to transmit a telecommunication signal voltage (Vtel) relative to ground 54. Inductor 184 is coupled to a voltage supply (V+) and to a collector of transistor 202. An emitter of transistor 202 is coupled to ground 54 and a base of transistor 202 is coupled to a Q output of flip-flop 188. A first input of gate 204 is coupled to terminal 105 to receive voltage Vm and a second input of gate 204 is coupled to receive a binary reset voltage (Vx). An output of gate 204 is coupled to a Reset (R) input of flip-flop 188. A Set (S) input of flip-flop 188 is coupled to an output of gate 190. A first input of gate 190 is coupled to the output of comparator 103 and a second input of gate 190 is coupled to an output of inverter 192. An input of inverter 192 is coupled to terminal 105 to receive voltage Vm. Voltage Vm is outputted by device 111 of FIG. 4.

Operationally during the adaptive mode when voltage Vm is in state Vhi, gate 204 responds to state Vhi at terminal 105 by producing state Vhi at the Reset input of flip-flop 188. A resulting reset state Vlo at the Q output of flip-flop 188 causes transistor 202 to be in a non-conductive state, maintaining a zero inductor current through inductor 184. Thus switches 180 and 182 are also in a nonconductive switching state during the adaptive mode. When the ring detect mode occurs, voltage Vm becomes state Vlo and voltage Vx is initialized to state Vlo. Flip-flop 188 remains in the reset state with state Vlo being at the Q output. Inverter 192 responds to state Vlo at terminal 105 by outputting state Vhi at the second input of gate 190. When the ring signal voltage is applied to line 38 and when voltage N|Vtr| exceeds voltage Vtha, comparator 103 outputs voltage Vrd with signal 93 at time 98, producing state Vhi at the first input of gate 190 during time period 0.25 Tp. As a result of state Vhi being at the first and second inputs of gate 190 at time 98, gate 190 outputs state Vhi at the Set input of flop-flop 188. The resulting state Vhi at the Q output causes current in transistor 202 to be in a conductive state, causing an inductor current to flow through inductor 184 and transistor 202 from voltage V+ to ground 54. As a result of current flow through inductor 184, switches 180 and 182 become in a conductive switching state, coupling line 38 to the output of device 114 through ports 70 and 72, through line 104 and through the off-hook diode bridge circuit in a well known manner. Since the output impedance of device 114 is the off-hook impedance, the off-hook impedance is coupled to line 38 during time period 0.25 Tp in response to signal 93. Document GR-506-CORE indicates that a maximum total off-hook resistance must be less than 430 ohms at the premise to insure that CO 30 recognizes the off-hook impedance as an answering state when it is coupled to line 38. When CO 30 recognizes the answering state, CO 30 terminates the ring signal voltage before the ring signal voltage can achieve sufficient magnitude or energy to activate the ringer mechanism associated with telephone device 166. A DC off-hook voltage (Voh) across device 114 during the answering state is equal to a DC voltage between the Tip and Ring wires [Vtr(DC)], across terminals 70 and 72, minus two forward biased diode voltage drops (2 Vd) associated with the off-hook diode bridge circuit, or Voh=[Vtr(DC)−2 Vd]. After the output impedance of device 114 is coupled to line 38, signal voltage Vtel can be received from line 38 and transmitted to line 38 by an associated telecommunication circuitry coupled to the output of device 114. Telecommunication circuitry may also be included within device 114 or coupled to device 114 for transmitting and receiving the signal voltage on line 38. After the off-hook impedance of device 114 is coupled to line 38, a predetermined telecommunication event associated with detector 101 may occur such as those described in the cross referenced patent application Ser. No. 08/876,446 by Davis. As a result, voltage Vx may momentarily becomes state Vhi in response to the telecommunication event to causes gate 204 to provide state Vhi at the Reset input of flip-flop 188. In response, the Q output provides state Vlo which causes transistor 202 to be in the non-conductive state, causing switches 180 and 182 to also be in the non-conductive switching state, which de-couples the impedance of device 114 from line 38. The uncoupling of device 114 from line 38 marks an end of a ring detect and response cycle, and the beginning of a subsequent ring detect and response cycle, assuming detector 101 remains in the ring detect mode.

Circuitry for each block associated with FIG. 4, FIG. 5, FIG. 6 and FIG, 9, is well known, and circuitry for device 102 and switch 106 is specifically shown in FIG. 9. Comparators 103 and 126 can employ National Semiconductor's LM339 Quad Voltage Comparator. Impedance device 114 can be implemented by several methods. For example, device 114 can be an off-hook resistor which is of a sufficiently low resistance to provide the off-hook impedance. Device 114 can also comprise a telephone IC device such as Motorola semiconductor's MC34014 Telephone Speech Network with Dialer Interface which provides the off-hook impedance as well as a telecommunication signal interface to receive and transmit telecommunication signals on line 38. Generator 86 and devices 130 and 136 can generate delay times using several well known methods. For example, the delay time can be achieved employing digital techniques by using a clock, a counter, a digital reference device, and a digital comparator. After initialization, clock cycles are counted and compared to a predetermined clock cycle count stored in a digital reference device. When the clock cycle count equals the stored count, signal 95 occurs and is outputted. The delayed signal 95 can also be achieved using well known analog techniques employing a charge storage element, a charge reference and a charge comparator. After initialization, a charge storage device is charged and compared with the charge reference. When the charge on the charge storage device exceeds the charge reference, signal 95 occurs and is outputted. The peak voltage detector 116 is well known such as a Harris Semiconductor HA-2420 3.2 uS Sample and Hold Amplifier to provide a peak voltage detecting function. The A/D converter 118 and storage device 120 are well known and are included together in Harris Semiconductor's ADC0804 A/D Converter, which provides an A/D conversion and digital storage function. The D/A converter 122 is well known such as Motorola Semiconductor's MC1408 D/A Converter. Inverters 128 and 192 are two of six of an industry standard 4069 Hex Inverter. The gates 132, 138, and 190 are three of four of an industry standard 4081 Quad 2-input AND gate. Flip Flops 134 and 188 are two of four of an industry standard 4043 Quad NOR R-S Latch. The OR gate 204 is one of four of an industry standard 4071 Quad 2-Input OR Gate. The diodes associated with the ring detect and off-hook diode bridges are 1N4004 devices, transistor 202 is a 2N2222 NPN transistor, and relay 186 is a Potter and Brumfield T81H5D312-05 telecommunications relay.

It should be apparent from the foregoing discussion that a novel telephone ring signal detector has been provided for distinguishing a telephone ring signal alternating voltage from a pre-ring alternating voltage on a telecommunication line. The ring signal detector is unresponsive to the pre-ring voltage and responsive only to the ring signal voltage by providing a telephone ring signal detect output signal during a first quarter cycle time period of a first telephone ring signal on the telecommunication line. The ring detect signal is independent of variations in a peak ring signal voltage, variations in a peak pre-ring voltage, variations in a pre-ring voltage transition time interval, variations in a telecommunication line resistance and inductance due to variations in a telecommunication line length, and independent of variations in a total ring signal impedance associated with premise telephones that are coupled to the telecommunication line at a premise. A telephone device off-hook terminal impedance is coupled to the line by a line switch in response to the ring detect signal during the first quarter cycle time period to provide an answering state on the line. As an option to provided high frequency filtering of line noise, the ring signal detector can provide a delayed telephone ring signal detect output signal in response to the ring detect output signal. For this optional case, the off-hook impedance is coupled to the line by a line switch in response to the delayed ring detect signal to provide the answering state on the line during the first quarter cycle time period. In either case, the Central Telephone Office recognizes the answering state and terminates the ring signal voltage before it can gain sufficient magnitude or energy to activate any telephone ringer mechanisms associated with line telephone devices connectable to the line. After the off-hook impedance is coupled to the line, telecommunication signals can be received from the line or transmitted to the line through the detector.

While the invention has been described in the context of preferred embodiments, it will be apparent to those skilled in the art that the present invention may be modified in numerous ways and may assume many embodiments other than those specifically set out and described above. Some examples of modifications to the preferred embodiment will follow. Scale factor N of device 102 can be further implemented by a well known resistor or capacitor voltage divider from the output of the ring detector bridge circuit to the output of device 102. Device 102 employs a voltage-to-voltage translation (Vtr to N|Vtr|) to translate voltage Vtr into voltage N|Vtr| having voltage Vp and voltage Vppr as described using FIG. 4. Device 102 can also provide many other types of translations. For example, device 102 can employ a voltage to current translation (Vtr to N|Itr|) to translate voltage Vtr into a translated telephone signal current (N|Itr|) having a peak ring signal current (Ip) and a peak pre-ring signal current (Ippr). Device 102 can also employ a voltage to digital translation (Vtr to N|Dtr|) to translate voltage Vtr into a translated telephone digital signal (N|Dtr|) having a peak ring digital signal (Dp) and a peak pre-ring digital signal (Dppr). In general, voltage N|Vtr| and current N|Itr| and digital signal N|Dtr| can each be generally referred to as a translated telephone signal. Voltage Vp and current Ip and digital signal Dp can each be generally referred to as a translated peak ring signal. Voltage Vppr and current Ippr and digital signal Dppr can each be generally referred to as a peak pre-ring signal. In the preferred embodiment, device 112 receives and holds voltage Vp, provides the storage control signal in response to voltage N|Vtr|, stores representation Ds of voltage Vp in response to the storage control signal, and outputs voltage Vthr. However, if the translated telephone signal is the signal current N|Itr|, then detector 117 is a peak current detector for holding current Ip. Device 123 provides the storage control signal in response to current N|Itr|, and device 119 converts current Ip to representation Ds in response to the storage control signal. Device 121 outputs an adaptive reference current, Ithr. When the translated telephone signal is the digital signal N|Dtr|, then detector 117 is a peak digital signal detector for holding the peak ring digital signal Dp. Device 123 provides the storage control signal in response to digital signal N|Dtr|, and device 119 converts digital signal Dp to the stored representation Ds in response to the storage control signal. Device 121 outputs an adaptive digital reference (Dthr). Voltage Vthr, current Ithr, and digital signal Dthr can each be generally referred to as an adaptive reference. When the translated telephone signal is current N|Itr| and the adaptive reference is current Ithr, comparator 103 is a current comparator having a comparator offset current (Ios). The ring detect signal occurs when current N|Itr| exceeds an adaptive threshold current (Itha) having a value greater than current Ippr and less than current Ip. Current Itha is a sum of current Ios plus current Ithr. When the translated telephone signal is digital signal N|Dtr and the adaptive reference is digital reference Dthr, comparator 103 is a digital comparator having a comparator digital offset, Dos, having a value including zero. The ring detect signal occurs when digital signal N|Dtr| exceeds an adaptive digital threshold (Dtha) having a value greater than digital signal Dppr and less than digital signal Dp. Digital threshold Dtha is a sum of digital offset Dos plus digital reference Dthr. Voltage Vtha, current Itha, digital signal Dtha can each be generally referred to as an adaptive threshold. Voltage Vos, current Ios, and digital offset Dos can each be generally referred to as a comparator offset. In general and in this context, the adaptive reference is a sum of the adaptive reference plus the comparator offset. As another example, it is will known that the connectivity of devices 112 and comparator 103 shown in FIG. 4 may be altered, yet provide the same function of device 112 and comparator 103 collectively. When terminal 110 of device 112 is coupled to the output of translating device 102, and when terminal 115 of device 112 is coupled to the first input of comparator 103 and when the second input of comparator 103 is coupled to ground 54, then the ring detect signal will still occur at the output of comparator 103 as previously discussed when voltage N|Vtr| exceeds voltage Vtha. Voltage Vtha in this case is still defined by the sum of voltages Vos and Vthr. As a further example, the method to implement comparator 103 can also be devised by many different circuits or structures. Comparator 103 can be an integrated circuit (IC) voltage comparator such as a National LM339 Quad Voltage Comparator with voltage Vos being +/− 0.005 volts, or comparator 103 can be a bipolar or MOS transistor with voltage Vos being defined by a base-to-emitter threshold voltage or by a gate-to-source threshold voltage respectively for a specific transistor comparator output current. For the bipolar or MOS transistor, the first comparator input can be the base or gate respectively, and the second comparator input can be the emitter or source respectively. Enabling switch 106 to be unresponsive to signal 93 (or signal 95) in the adaptive mode can be achieved by many methods, which includes disabling comparator 103 in response to voltage Vm. This provides for switch 106 to be unresponsive to voltage Vrd, since a disabled comparator 103 causes voltage Vrd to be unresponsive to voltage N|Vtr|. Since voltage Vrd is unresponsive to voltage N|Vtr|, then switch 106 is unresponsive to voltage N|Vtr|. Although device 112 is shown in FIG. 5 and FIG. 6 to employ specific separate circuit blocks, these block functions are often provided in one circuit device. For example, converter 118 and device 120 are typically merged together into one circuit device such as an A/D converter IC. Device 123 of FIG. 6 demonstrates only one of many methods to output the storage control signal for time interval Ts after time period 0.25 Tp. For example in U.S. Pat. No. 4,939,775 to Houck et al, on Jul. 3, 1990, short ring signal bursts are detected within 100 mS. Thus by employing Houck's techniques, the storage control signal can be provided immediately after detecting the short ring signal bursts. Thus voltage Vthr can be adapted to voltage Vp within a few ring signal cycles and after a few values of voltage Vp. Switch 106 demonstrates one of many methods to couple device 114 to line 38. For example, semiconductor devices in combination with other electronic devices can be employed to replace relay 186 for coupling device 114 to line 38. A predetermined switching between the first and second mode control signals can occur anytime after the first quarter cycle time period when voltage Vp can be determined such as during a first telephone ring signal burst, during a time period between ring signal bursts, or when the ring signal is inactive. These examples are just a few of the ways in which changes to the preferred embodiment of the present invention are obvious to anyone skilled in the art. Thus these and other similar changes do not alter the intended spirit and scope of the present invention.

Accordingly it is intended by the appended claims to cover all modifications of the invention, rather then just the preferred embodiments provided, which fall within the true spirit and scope of the invention.

I claim:

1. A telephone ring signal detector for detecting a telephone ring signal having a peak ring signal on a telecommunication line and for distinguishing said telephone ring signal from a telephone pre-ring signal having a peak pre-ring signal on said telecommunication line comprising:

a signal translating means for translating said telephone ring signal and said telephone pre-ring signal into a translated telephone signal having a translated peak ring signal and a translated peak pre-ring signal, respectively;

a mode control means for providing a first predetermined mode control signal and a second predetermined mode control signal;

an adaptive reference means for generating an adaptive reference in response to said translated telephone signal upon having received said first predetermined mode control signal, said adaptive reference means providing said adaptive reference as an output upon having received said second predetermined mode control signal; and a comparator means for outputting a ring signal detect output signal when said adaptive reference means is providing said adaptive reference as an output, and when said translated telephone signal exceeds an adaptive threshold, said adaptive threshold having a value greater than said translated peak pre-ring signal and less than said translated peak ring signal, said comparator means having a comparator means offset, and said adaptive threshold being a sum of said adaptive reference plus said comparator means offset, whereby said ring signal detect output signal occurs during a first quarter cycle time period of a first telephone ring signal on said telecommunication line.

2. The telephone ring signal detector according to claim 1 further comprising:

a line impedance means for providing a telephone device off-hook terminal impedance; and a line switch means for coupling said line impedance means to said telecommunication line in response to said ring signal detect output signal, whereby enabling said telephone device off-hook terminal impedance of said line impedance means to be coupled to said telecommunication line in response to said ring signal detect output signal.

3. The telephone ring signal detector according to claim 1 wherein said adaptive reference means comprising:

a peak signal detector means for holding said translated peak ring signal;

a storage timing means for providing a storage control signal for a predetermined storage time interval after said first quarter cycle time period;

a peak signal storage means for providing a stored representation of said translated peak ring signal in response to said storage control signal; and a signal converter means for converting said stored representation of said translated peak ring signal into said adaptive reference.

4. The telephone ring signal detector according to claim 2 further comprising:

a line switch mode control input means for receiving said first and second predetermined mode control signals;

whereby said first predetermined mode control signal renders said line switch means unresponsive to said translated telephone signal, and said second predetermined mode control signal enables said line switch means responsive to said ring signal detect output signal generated from said translated telephone signal.

5. A telephone ring signal detector for detecting a telephone ring signal having a peak ring signal on a telecommunication line and for distinguishing said telephone ring signal from a telephone pre-ring signal having a peak pre-ring signal on said telecommunication line comprising:

a signal translating means having a signal translating means input coupled to said telecommunication line for receiving said telephone ring signal and said telephone pre-ring signal and having a signal translating means output for outputting a translated telephone signal having a translated peak ring signal and a translated peak pre-ring signal;

a mode control means having an output for providing a first predetermined mode control signal and a second predetermined mode control signal;

an adaptive reference means having an adaptive reference means input coupled to said signal translating means output for receiving said translated telephone signal and having an adaptive reference mode control input means coupled to said mode control means output for receiving said first and second predetermined mode control signals, and having an adaptive reference means output for outputting an adaptive reference in response to said translated telephone signal said adaptive reference means generating said adaptive reference in response to said translated telephone signal upon said adaptive reference means having received said first predetermined mode control signal and for providing said adaptive reference at said adaptive reference means output upon said adaptive reference means having received said second predetermined mode control signal; and a comparator means having a first comparator means input coupled to said signal translating means output for receiving said translated telephone signal and having a second comparator means input coupled to said adaptive reference means output for receiving said adaptive reference, said comparator means having an output for outputting a ring signal detect output signal when said adaptive reference means is providing said adaptive reference and in response to said translated telephone signal exceeding an adaptive threshold having a value greater than said translated peak pre-ring signal and less than said translated peak ring signal, said comparator means having an offset, wherein said adaptive threshold is a sum of said adaptive reference plus said offset, whereby said ring signal detect output signal occurs during a first quarter cycle time period of a first telephone ring signal on said telecommunication line.

6. The telephone ring signal detector according to claim 5 further comprising:

a line impedance means having a line impedance means output for providing a telephone device off-hook terminal impedance; and a line switch means having a line switch means input coupled to said comparator means output for receiving said ring signal detect output signal, and having a first coupling input coupled to said telecommunication line and having a second coupling input coupled to said line impedance means output for coupling said line impedance means output to said telecommunication line in response to said ring signal detect output signal, whereby enabling said telephone device off-hook terminal impedance of said line impedance means to be coupled to said telecommunication line in response to said ring signal detect output signal.

7. The telephone ring signal detector according to claim 5 wherein said adaptive reference means comprising:

a peak signal detector means having a peak signal detector means input coupled to said adaptive reference means input for receiving said translated telephone signal and having a peak signal detector means output for outputting and holding said translated peak ring signal;

a storage timing means having a storage timing means input coupled to said adaptive reference means input for receiving said translated telephone signal and having a storage timing means output for outputting a storage control signal for a predetermined storage time interval after said first quarter cycle time period;

a peak signal storage means having a peak signal storage means input coupled to said peak signal detector means output for receiving said translated peak ring signal and having a peak signal storage means output for outputting a stored representation of said translated peak ring signal and having a peak signal storage enable input coupled to said storage timing means output for receiving said storage control signal which enables said peak signal storage means to store said translated peak ring signal as said stored representation in response to said storage control signal; and a signal converter means having a signal converter means input coupled to said peak signal storage means output for receiving said stored representation of said translated peak ring signal and having a signal converter means output coupled to said adaptive reference means output for outputting said adaptive reference.

8. The telephone ring signal detector according to claim 6 further comprising:

a line switch mode control input means being coupled to said line switch means and to said mode control means output for receiving said first and second predetermined mode control signals;

whereby said first predetermined mode control signal renders said line switch means unresponsive to said translated telephone signal, and said second predetermined mode control signal enables said line switch means responsive to said ring signal detect output signal generated from said translated telephone signal.

9. A method for detecting a telephone ring signal having a peak ring signal on a telecommunication line and for distinguishing said telephone ring signal from a telephone pre-ring signal having a peak pre-ring signal on a telecommunication line comprising the steps of:

a) activating, in a mode control device, a first predetermined mode control signal to activate an adaptive reference generation mode, thereby deactivating a second predetermined mode control signal to deactivate a ring signal detect mode;

receiving said telephone ring signal and said telephone pre-ring signal;

translating, in a signal translating device, said telephone ring signal and said telephone pre-ring signal into a translated telephone signal having a translated peak ring signal and a translated peak pre-ring signal, respectively;

outputting said translated telephone signal to an adaptive reference device;

receiving said translated telephone signal;

generating, at said adaptive reference device, an adaptive reference in response to said translated telephone signal;

b) activating, in said mode control device, said second predetermined mode control signal to activate said ring signal detect mode, thereby deactivating said first predetermined mode control signal to deactivate said adaptive reference generation mode;

receiving said telephone ring signal and said telephone pre-ring signal;

translating, in said signal translating device, said telephone ring signal and said telephone pre-ring signal into said translated telephone signal having said translated peak ring signal and said translated peak pre-ring signal, respectively;

outputting said translated telephone signal to a comparator;

receiving said translated telephone signal;

comparing, in said comparator said translated telephone signal to an adaptive threshold having a value greater than said translated peak pre-ring signal and less than said translated peak ring signal, said comparing step generating a comparator offset, resulting in said adaptive threshold being a sum of said adaptive reference plus said comparator offset; and outputting, from said comparator a ring signal detect output signal when said translated telephone signal exceeds said adaptive threshold, whereby said ring signal detect output signal occurs during a first quarter cycle time period of a first telephone ring signal on said telecommunication line.

10. The method for detecting a telephone ring signal according to claim 9 further comprising the steps of:

providing a telephone device off-hook terminal impedance;

receiving said ring signal detect output signal; and coupling said telephone device off-hook terminal impedance to said telecommunication line in response to said ring signal detect output signal.

11. The method for detecting a telephone ring signal according to claim 9 a) wherein the step of generating an adaptive reference in response to said translated telephone signal further comprises the steps of:

holding said translated peak ring signal;

outputting said translated peak ring signal;

receiving said translated peak ring signal;

outputting a storage control signal for a predetermined storage time interval after said first quarter cycle time period;

storing said translated peak ring signal as a stored representation of said translated peak ring signal in response to said storage control signal;

outputting said stored representation; and converting said stored representation into said adaptive reference.

12. A telephone ring signal detector for detecting a telephone ring signal having a peak ring signal on a telecommunication line and for distinguishing said telephone ring signal from a telephone pre-ring signal having a peak pre-ring signal on said telecommunication line comprising:

a signal translating means for translating said telephone ring signal and said telephone pre-ring signal into a translated telephone signal having a translated peak ring signal and a translated peak pre-ring signal, respectively;

a mode control means for providing a first predetermined mode control signal and a second predetermined mode control signal;

an adaptive reference means for generating an adaptive reference in response to said translated telephone signal upon having received said first predetermined mode control signal, said adaptive reference means providing said adaptive reference as an output upon having received said second predetermined mode control signal;

a comparator means for outputting a ring signal detect output signal when said adaptive reference means is providing said adaptive reference as an output, and when said translated telephone signal exceeds an adaptive threshold, said adaptive threshold having a value greater than said translated peak pre-ring signal and less than said translated peak ring signal, said comparator means having a comparator means offset, and said adaptive threshold being a sum of said adaptive reference plus said comparator means offset, and a ring signal detect delay time generator means for providing a delayed ring signal detect output signal in response to said ring signal detect output signal after a predetermined ring signal detect delay time, whereby said delayed ring signal detect output signal occurs during a first quarter cycle time period of a first telephone ring signal on said telecommunication line.

13. The telephone ring signal detector according to claim 12 further comprising:

a line impedance means for providing a telephone device off-hook terminal impedance; and a line switch means for coupling said line impedance means to said telecommunication line in response to said delayed ring signal detect output signal, whereby enabling said telephone device off-hook terminal impedance of said line impedance means to be coupled to said telecommunication line in response to said delayed ring signal detect output signal.

14. The telephone ring signal detector according to claim 12 wherein said adaptive reference means comprising:

a peak signal detector means for holding said translated peak ring signal;

a storage timing means for providing a storage control signal for a predetermined storage time interval after said first quarter cycle time period;

a peak signal storage means for providing a stored representation of said translated peak ring signal in response to said storage control signal; and a signal converter means for converting said stored representation of said translated peak ring signal into said adaptive reference.

15. The telephone ring signal detector according to claim 13 further comprising:

a mode control means for providing a first predetermined mode control signal and a second predetermined mode control signal;

a line switch mode control input means for receiving said first and second predetermined mode control signals; and an adaptive reference mode control input means for receiving said first and second predetermined mode control signals, whereby said first predetermined mode control signal enables said line switch means to be unresponsive to said translated telephone signal and enables said adaptive reference means to generate said adaptive reference, and said second predetermined mode control signal enables said line switch means to be responsive to said delayed ring signal detect output signal and enables said adaptive reference means to provide a substantially constant value of said adaptive reference.

16. A telephone ring signal detector for detecting a telephone ring signal having a peak ring signal on a telecommunication line and for distinguishing said telephone ring signal from a telephone pre-ring signal having a peak pre-ring signal on said telecommunication line comprising:

a signal translating means having a signal translating means input coupled to said telecommunication line for receiving said telephone ring signal and said telephone pre-ring signal and having a signal translating means output for outputting a translated telephone signal having a translated peak ring signal and a translated peak pre-ring signal;

a mode control means having an output for providing a first predetermined mode control signal and a second predetermined mode control signal;

an adaptive reference means having an adaptive reference means input coupled to said signal translating means output for receiving said translated telephone signal and having an adaptive reference mode control input means coupled to said mode control means output for receiving said first and second predetermined mode control signals, and having an adaptive reference means output for outputting an adaptive reference in response to said translated telephone signal said adaptive reference means generating said adaptive reference in response to said translated telephone signal upon said adaptive reference means having received said first predetermined mode control signal and for providing said adaptive reference at said adaptive reference means output upon said adaptive reference means having received said second predetermined mode control signal;

a comparator means having a first comparator means input coupled to said signal translating means output for receiving said translated telephone signal and having a second comparator means input coupled to said adaptive reference means output for receiving said adaptive reference, said comparator means having an output for outputting a ring signal detect output signal when said adaptive reference means is providing said adaptive reference and in response to said translated telephone signal exceeding an adaptive threshold having a value greater than said translated peak pre-ring signal and less than said translated peak ring signal, said comparator means having an offset, wherein said adaptive threshold is a sum of said adaptive reference plus said offset; and a ring signal detect delay time generator means having a ring signal detect delay time generator means input coupled to said comparator means output to receive said ring signal detect output signal and having a ring signal detect delay time generator means output for providing a delayed ring signal detect output signal in response to said ring signal detect output signal after a predetermined ring signal detect delay time, whereby said delayed ring signal detect output signal occurs during a first quarter cycle time period of a first telephone ring signal on said telecommunication line.

17. The telephone ring signal detector according to claim 16 further comprising:

a line impedance means having a line impedance means output for providing a telephone device off-hook terminal impedance; and a line switch means having a line switch means input coupled to said ring signal detect delay time generator means output for receiving said delayed ring signal detect output signal, and having a first coupling input coupled to said telecommunication line and having a second coupling input coupled to said line impedance means output for coupling said line impedance means output to said telecommunication line in response to said delayed ring signal detect output signal, whereby enabling said telephone device off-hook terminal impedance of said line impedance means to be coupled to said telecommunication line in response to said delayed ring signal detect output signal.

18. The telephone ring signal detector according to claim 16 wherein said adaptive reference means comprising:

a peak signal detector means having a peak signal detector means input coupled to said adaptive reference means input for receiving said translated telephone signal and having a peak signal detector means output for outputting and holding said translated peak ring signal;

a storage timing means having a storage timing means input coupled to said adaptive reference means input for receiving said translated telephone signal and having a storage timing means output for outputting a storage control signal for a predetermined storage time interval after said first quarter cycle time period;

a peak signal storage means having a peak signal storage means input coupled to said peak signal detector means output for receiving said translated peak ring signal and having a peak signal storage means output for outputting a stored representation of said translated peak ring signal and having a peak signal storage enable input coupled to said storage timing means output for receiving said storage control signal which enables said peak signal storage means to store said translated peak ring signal as said stored representation in response to said storage control signal; and a signal converter means having a signal converter means input coupled to said peak signal storage means output for receiving said stored representation of said translated peak ring signal and having a signal converter means output coupled to said adaptive reference means output for outputting said adaptive reference.

19. The telephone ring signal detector according to claim 17 further comprising:

a line switch mode control input means being coupled to said line switch means and to said mode control means output for receiving said first and second predetermined mode control signals;

whereby said first predetermined mode control signal renders said line switch means unresponsive to said translated telephone signal, and said second predetermined mode control signal enables said line switch means responsive to said delayed ring signal detect output signal generated from said translated telephone signal.

20. A method for detecting a telephone ring signal having a peak ring signal on a telecommunication line and for distinguishing said telephone ring signal from a telephone pre-ring signal having a peak pre-ring signal on a telecommunication line comprising the steps of:

a) activating, in a mode control device, a first predetermined mode control signal to activate an adaptive reference generation mode, thereby deactivating a second predetermined mode control signal to deactivate a ring signal detect mode;

receiving said telephone ring signal and said telephone pre-ring signal;

translating, in a signal translating device, said telephone ring signal and said telephone pre-ring signal into a translated telephone signal having a translated peak ring signal and a translated peak pre-ring signal, respectively;

outputting said translated telephone signal to an adaptive reference device;

generating, at said adaptive reference device, an adaptive reference in response to said translated telephone signal;

b) activating, in said mode control device, said second predetermined mode control signal to activate said ring signal detect mode, thereby deactivating said first predetermined mode control signal to deactivate said adaptive reference generation mode;

receiving said telephone ring signal and said telephone pre-ring signal;

translating, in said signal translating device, said telephone ring signal and said telephone pre-ring signal into said translated telephone signal having said translated peak ring signal and said translated peak pre-ring signal, respectively;

outputting said translated telephone signal to a comparator;

receiving said translated telephone signal;

comparing, in said comparator, said translated telephone signal to an adaptive threshold having a value greater than said translated peak pre-ring signal and less than said translated peak ring signal, said comparing step generating a comparator offset, resulting in said adaptive threshold being a sum of said adaptive reference plus said comparator offset;

outputting, from said comparator, a ring signal detect output signal when said translated telephone signal exceeds said adaptive threshold;

generating a predetermined ring signal detect delay time in response to said ring signal detect output signal; and outputting a delayed ring signal detect output signal after said predetermined ring signal detect delay time, whereby said delayed ring signal detect output signal occurs during a first quarter cycle time period of a first telephone ring signal on said telecommunication line.

21. The method for detecting a telephone ring signal according to claim 20 further comprising the steps of:

provrding a telephone device off-hook terminal impedance;

receiving said delayed ring signal detect output signal; and coupling said telephone device off-hook terminal impedance to said telecommunication line in response to said delayed ring signal detect output signal.

22. The method for detecting a telephone ring signal according to claim 20 a) wherein the step of generating an adaptive reference in response to said translated telephone signal further comprises the steps of:

receiving said translated telephone signal;

holding said translated peak ring signal;

outputting said translated peak ring signal;

receiving said translated peak ring signal;

outputting a storage control signal for a predetermined storage time interval after said first quarter cycle time period;

storing said translated peak ring signal as a stored representation of said translated peak ring signal in response to said storage control signal;

outputting said stored representation; and converting said stored representation into said adaptive reference.

* * * * *